(12) United States Patent
Roth et al.

(10) Patent No.: US 10,263,997 B2
(45) Date of Patent: *Apr. 16, 2019

(54) DATA INTEGRITY VERIFICATION

(71) Applicant: Amazon Technologies, Inc., Seattle, WA (US)

(72) Inventors: Gregory Branchek Roth, Seattle, WA (US); Gregory Alan Rubin, Seattle, WA (US); Matthew John Campagna, Bainbridge Island, WA (US); Petr Praus, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/217,624

(22) Filed: Jul. 22, 2016

(65) Prior Publication Data

US 2016/0330214 A1 Nov. 10, 2016

Related U.S. Application Data

(63) Continuation of application No. 14/284,266, filed on May 21, 2014, now Pat. No. 9,405,920.

(51) Int. Cl.
*G06F 21/00* (2013.01)
*H04L 29/06* (2006.01)
(Continued)

(52) U.S. Cl.
CPC .......... *H04L 63/123* (2013.01); *G06F 21/602* (2013.01); *G06F 21/604* (2013.01);
(Continued)

(58) Field of Classification Search
CPC ...... G06F 21/60; G06F 21/602; G06F 21/604; G06F 21/64; G06F 21/645; H04L 9/0877; H04L 9/088
See application file for complete search history.

(56) References Cited

U.S. PATENT DOCUMENTS 6,633,980 B1 * 10/2003 Johnson ................ H04L 63/068
713/168
7,802,111 B1 * 9/2010 Tahan ..................... G06F 21/57
380/259

(Continued)

OTHER PUBLICATIONS

Dworkin, M., "Recommendation for Block Cipher Modes of Operation: The CCM Mode for Authentication and Confidentiality," National Institute of Standards and Technology, Special Publication 800-38C, 27 pages, May 2004.

(Continued)

*Primary Examiner* — Edward Zee
(74) *Attorney, Agent, or Firm* — Davis Wright Tremaine LLP

(57) ABSTRACT

A system performs cryptographic operations utilizing information usable to verify validity of plaintext. To prevent providing information about a plaintext by providing the information usable to verify the validity of the plaintext, the system provides the information usable to verify validity of the plaintext to an entity on a condition that the entity is authorized to access the plaintext. The information usable to verify validity of the plaintext may be persisted in ciphertext along with the plaintext to enable the plaintext to be verified when decrypted.

21 Claims, 13 Drawing Sheets

(51) Int. Cl.
  *G06F 21/60* (2013.01)
  *G06F 21/64* (2013.01)
(52) U.S. Cl.
  CPC ............ *G06F 21/64* (2013.01); *G06F 21/645* (2013.01); *H04L 63/061* (2013.01)

(56) References Cited

U.S. PATENT DOCUMENTS

| | | | | |
|---|---|---|---|---|
| 2002/0066014 | A1* | 5/2002 | Dworkin | H04L 9/0643 713/168 |
| 2008/0034199 | A1* | 2/2008 | Nair | G06F 21/602 713/153 |
| 2011/0093717 | A1* | 4/2011 | Iwao | H04L 9/12 713/179 |
| 2012/0144210 | A1* | 6/2012 | Yacobi | H04L 9/0836 713/193 |
| 2015/0161059 | A1* | 6/2015 | Durham | G06F 12/1408 713/193 |

OTHER PUBLICATIONS

Dworkin, M., "Recommendation for Block Cipher Modes of Operation: Galois/Counter Mode (GCM) and GMAC," National Institute of Standards and Technology, Special Publication 800-38D, 37 pages, Nov. 2007.

Krawczyk, H., "The Order of Encryption and Authentication for Protecting Communications (Or: How Secure Is SSL?)," Cryptology ePrint Archive: Report 2001/045, Jun. 6, 2001 <http://eprint.iacr.org/2001/045> [retrieved May 22, 2014], 1 page.

"Security Requirements for Cryptographic Modules," National Institute of Standards and Technology, Federal Information Processing Standards Publication 140-1, Jan. 11, 1994, 56 pages.

"Security Requirements for Cryptographic Modules," National Institute of Standards and Technology, Federal Information Processing Standards Publication 140-2, May 25, 2001, 69 pages.

* cited by examiner

US 10,263,997 B2

DATA INTEGRITY VERIFICATION

CROSS REFERENCE TO RELATED APPLICATIONS

This application is a continuation of U.S. patent application Ser. No. 14/284,266, filed May 21, 2014, entitled "DATA INTEGRITY VERIFICATION," which is incorporated by reference for all purposes.

BACKGROUND

In some contexts, the integrity of data is of secondary importance. In audio or video data, for example, applications that process the data are often robust enough such that minor changes in the data relative to its original state do not have a significant effect. A minor corruption to a video file, for example, may cause a defect in the video display that is not humanly perceptible or, if perceptible, highly insignificant. In other contexts, however, the integrity of data is of higher importance. Some applications, for example, are not robust enough to successfully handle data corruption errors. As an illustration, an application that utilizes a cryptographic primitive (e.g., an encryption/decryption algorithm and/or digital signature algorithm) may provide invalid results if a cryptographic key becomes corrupt, even by a single bit, between a first use (e.g., for encryption or generation of a digital signature) and a second use (e.g., decryption or verification of a digital signature).

With computer networks and distributed systems in general, data can have multiple opportunities for becoming corrupt. For example, transmission of data over a network involves numerous operations, each typically having a small probability of corrupting the data. For instance, data is typically written to some sort of memory and the writing process may not always complete without errors, such as a bit changing from zero to one, or vice versa. Reading the data out of memory can also introduce the opportunity for corruption. Transmitting the data to the network often involves the transmission of data through multiple components of a computing device until, for example, the data passes out of a network interface card onto the network. Similarly, on a network, the data may pass through multiple computing devices (e.g., routers and/or other network devices) and through multiple components of those computing devices. When the data has reached its destination device, it may pass through multiple components and be written to memory. Finally, while at rest (e.g., persistently stored in non-volatile memory), numerous operations may affect the data, such as encryption operations, compression operations or movement of the data from one storage location to another. While each of these operations affecting the data may have a very low probability of corrupting it when components involved with the data are functioning properly, the aggregate probability of data corruption may be significant with large enough volumes of data.

BRIEF DESCRIPTION OF THE DRAWINGS

Various embodiments in accordance with the present disclosure will be described with reference to the drawings, in which.

DETAILED DESCRIPTION

Figure 1:
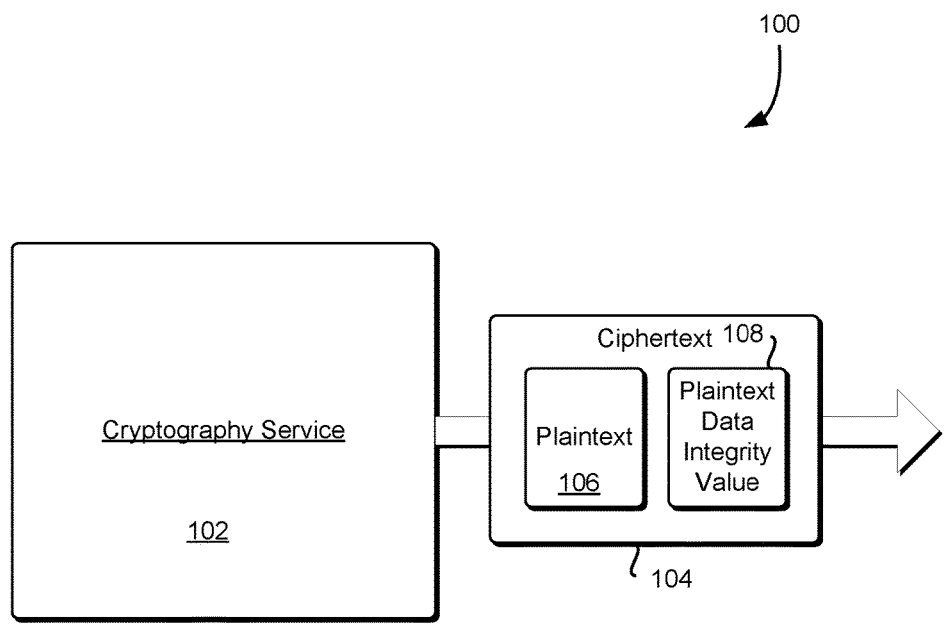
FIG. 1 shows an illustrative example of an environment in which various embodiments may be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein provide enhancements to computer systems' abilities to ensure integrity of data. In some embodiments, a computer system performs cryptographic operations involving ciphertext. The operations may be, for example, encryption of data to generate the ciphertext and/or decryption of ciphertext to obtain a plaintext. In some examples, the operations include generation of the plaintext, such as in embodiments where the plaintext is a cryptographic key used in other cryptographic operations.

In various embodiments, the plaintext is associated with a plaintext data integrity value, abbreviated sometimes as PDIV. In some examples, the plaintext data integrity value is a cryptographic hash (e.g., secure hash algorithm (SHA)-256 hash) of the plaintext or otherwise based at least in part on a cryptographic hash of the plaintext (e.g., by being a portion of a cryptographic hash of the plaintext). Generally, the plaintext data integrity value is an example of information usable to verify the validity of the plaintext. Other example types of information include general hash algorithms, checksums and the data itself (e.g., in cases where the data itself is small and use of a hash or other value does not provide space efficiency). In some examples, the information usable to verify validity of the plaintext is sufficient for verification of validity of the plaintext and/or usable to verify validity of the plaintext without a cryptographic key. In some examples, the plaintext data integrity value is provided to the computer system from another computer system that also provides the plaintext (e.g., to cause the computer system to encrypt the plaintext). In other examples, the computer system that performs the cryptographic operations generates the plaintext data integrity value, such as when the computer system generates the plaintext itself.

In various embodiments, the computer system encrypts plaintexts such that resulting ciphertexts encrypt not only the corresponding plaintext, but a plaintext data integrity value for the plaintext as well. The actual data that is encrypted may be configured such that, when decrypted, the computer system or a similarly configured computer system can detect the presence of the plaintext data integrity value and operate accordingly. For example, the data input into an encryption algorithm may be organized in a structured format with delimiters that enables extraction of various components of the data (e.g., plaintext and plaintext data integrity value).

In various contexts, information usable to verify the integrity of data may provide information that, at least partially, facilitates a cryptographic attack. Some cryptographic algorithms include operations that utilize a hash of a cryptographic key being input into the cryptographic algorithms. As a result, access to the hash may, from the perspective of an attacker, may be equivalent to access to the key. Generally, the existence of a hash of data provides at least some information about the data (e.g., the fact that the hash resulted from application of a particular hash function to the data), which can facilitate cryptographic attacks. Accordingly, various embodiments of the present disclosure enhance security by limiting access to hashes and other information usable to verify the validity of data. In an embodiment, the computer system discussed above is configured to operate such that access to a plaintext data integrity value requires access to the plaintext itself, where authorization for access may be proven cryptographically, such as through digital signatures and/or, generally, information sufficient for authentication of an entity authorized to access the plaintext, where a collection of information sufficient for authentication may be referred to as an authentication claim. For example, the computer system may receive a request to decrypt ciphertext. If the requestor is authorized to cause such a request to be fulfilled, the computer system may provide the ciphertext and, if the ciphertext includes a plaintext data integrity value, provide the plaintext data integrity value. In this manner, the plaintext data integrity value is only provided to an entity authorized to access the plaintext since access to the plaintext, in some embodiments, enables calculation of the plaintext data integrity value.

The computer system described above may perform various types of cryptographic operations in connection with plaintext data integrity values. For example, the computer system may fulfill properly authenticated requests to encrypt plaintexts provided in the requests. As another example, the computer system may fulfill properly authenticated requests to generate plaintexts, encrypt the generated plaintexts and provide resulting ciphertexts. As yet another example, the computer system may fulfill properly authenticated requests to decrypt ciphertexts and provide resulting plaintexts. As yet another example, the computer system may be configured to fulfill properly authenticated requests to re-encrypt a ciphertext to a different cryptographic key and provide a resulting ciphertexts. In various embodiments, the use of a plaintext data integrity value (or other information usable to verify data integrity) is optional for callers (submitters of request) to the computer system. In some examples, the option is elected by indicating in a request that a plaintext data integrity value is part of fulfillment of the request. For example, a request to encrypt plaintext may indicate such by including a plaintext data integrity value. As another example, a request to generate and encrypt plaintext may indicate such by indicating a type of plaintext data integrity value to use. As yet another example, a request to decrypt a ciphertext may indicate such by the ciphertext encrypting a plaintext data integrity value that is detected upon encryption. Generally, the request may include information that, as a result of its inclusion, causes fulfillment of the request to utilize a plaintext data integrity value. Example ways of utilizing a plaintext data integrity value are discussed in more detail below.

FIG. 1 shows an illustrative example of an environment 100 in which various embodiments may be practiced. In the environment of FIG. 1, a cryptography service 102 is a computer system which is a distributed computer system in some embodiments, although cryptography services implemented by a single computing device are considered as being within the scope of the present disclosure. In various embodiments, the cryptography service 102 is configured to perform cryptographic operations as a service to other computer systems which may be in the environment 100 but which, to avoid obscuring the figure, are omitted from the drawing. As illustrated in FIG. 1, some of the operations performed by cryptography service 102 may include encryption or decryption. Accordingly as illustrated in FIG. 1 the cryptography service 102, as part of providing its services, may generate ciphertext 104. In an embodiment, ciphertext 104 produced by the cryptography service 102 includes more than just plaintext 106 that is encrypted by the ciphertext 104. In this particular example the ciphertext 104 includes a plaintext data integrity value 108. As noted above, the plaintext data integrity value 108 is an example of information useable to verify validity of the plaintext 106. In some examples, the plaintext data integrity value 108 is a cryptographic hash of the plaintext 106. As an illustrative example, the plaintext data integrity value 108 may be a secure hash algorithm (SHA)-256 algorithm of the plaintext 106. It should be noted however, that other types of information useable to verify validity of the plaintext 106 are also considered as being within the scope of the present disclosure. As an example, the plaintext data integrity value may be a value generated based at least in part\on a cryptographic hash of the plaintext 106. For instance, the plaintext data integrity value may comprise a proper subset of the bits that form the cryptographic hash of the plaintext 106. The proper subset may be determined from a cryptographic hash of the plaintext 106 in a deterministic manner. For instance, the plaintext data integrity value may be the first N bits of the cryptographic hash of the plaintext 106, where N is a positive integer. Other examples are also considered as being within the scope of the present disclosure.

As illustrated in FIG. 1, the cryptography service 102 may provide ciphertexts 104 that include plaintext 106 and corresponding plaintext data integrity values 108, and in some embodiments additional information. Providing the ciphertext 104 may be responsive to a request received from another computer system to the cryptography service 102 such as described below in more detail. The cryptography service 102 may be or otherwise comprise one or more security modules such as hardware security modules (HSM) that perform cryptographic operations such as generating the ciphertext 104. When a security module of the cryptography service 102 generates the ciphertext 104, the cryptography service 102 may obtain the ciphertext 104 and provide the ciphertext 104 over network to the computer system that submitted the request that caused generation of the ciphertext 104.

As discussed in more detail below, other cryptographic operations may also be performed by the cryptography service 102, such as decryption, digital signature generation, digital signature verification and random number generation. As discussed in more detail below, providing the results of decryption, which in some instances may include plaintext 106 and a plaintext to data integrity value 108, may be subject to certain conditions such as successful authentication of a request to perform decryption and provide results thereof. In this manner, access to the plaintext data integrity value 108 is conditioned upon authorization to access the plaintext 106. Thus, unauthorized entities are unable to obtain a plaintext data integrity value 108 to thereby obtain information about the plaintext 106. Generally, a cryptography service may be configured to operate based at least in part on whether requests submitted to the cryptography service are properly authenticated, and whether fulfillment of the requests are authorized.

Figure 2:
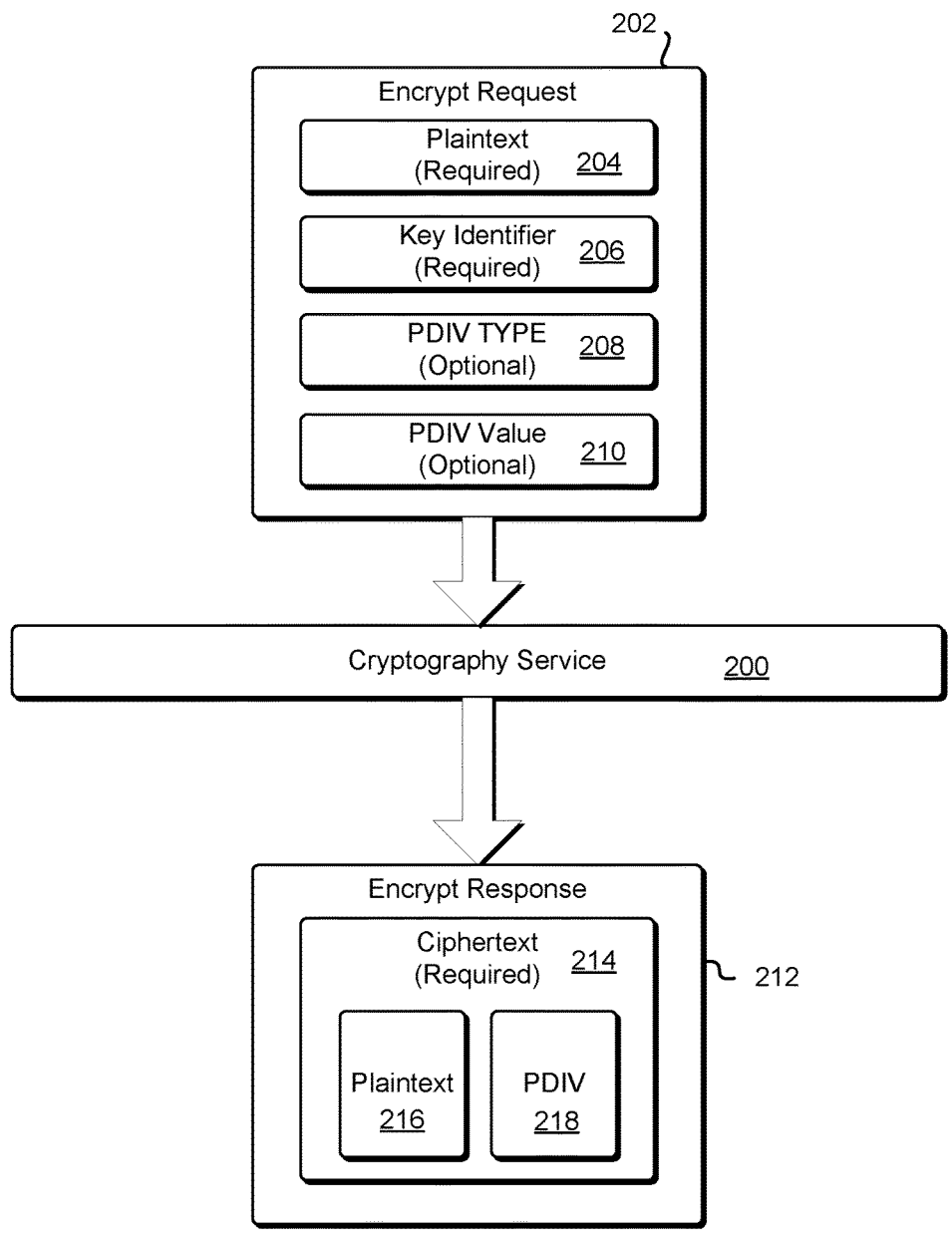
FIG. 2 shows an illustrative example of a cryptography service processing an encrypt request in accordance with at least one embodiment.

FIG. 2 shows an illustrative example of the cryptography service 200, how it may process certain requests and, in this example, requests to perform encryption operations. The cryptography service 200 may be the cryptography service 102 discussed above in connection with FIG. 1 and discussed in more detail below in connection with FIG. 12. In an embodiment, the cryptography service 200 provides an application programming interface (API) through which various requests may be submitted. One of the requests that may be submitted to the API of the cryptography service 200 may be an encrypt request 202. The encrypt request 202 may be a request configured to cause the cryptography service to perform one or more encryption operations in accordance with parameters specified in the request 202.

In an embodiment, the encrypt request 202 has one or more parameters that are required to be specified and one or more optional parameters. A parameter of a request may be said to be required if a system processing the request requires the parameter to be specified in order to successfully fulfill the request. In some embodiments, not only are certain parameters required, but there may be additional conditions on how the parameters are specified. In an embodiment, one of the parameters of the encrypt request 202 is a plaintext parameter 204. The plaintext parameter 204 may be required for the encrypt request to provide the cryptography service 200 information to encrypt. In various embodiments the plaintext parameter 204 includes the plaintext to encrypt. However, in some embodiments, the encrypt request may otherwise specify the plaintext, such as by providing a reference useable to locate the plaintext from outside of the encrypt request 202. As discussed below, the plaintext in some embodiments may be a cryptographic key used to encrypt other data and the encrypt data 202 may be submitted for the purpose of securely storing an encrypted version of that cryptographic key so as to prevent access to the data. However, the scope of the present disclosure includes embodiments where the plaintext is or otherwise includes data other than a cryptographic key.

In an embodiment, the encrypt request 202 has a key identifier parameter 206 which, in this example, is a required parameter. The key identifier parameter 206 may be a parameter that specifies a cryptographic key to use when performing encryption as part of fulfillment of the encrypt request 202. The key identifier parameter 206 may specify a cryptographic key to be used to encrypt the plaintext 204 specified in the plaintext parameter 204. It should be noted that, while FIG. 2 shows the key identifier parameter 206 as a required parameter, the cryptography service may operate with the key identifier parameter as an optional parameter or, in some embodiments, without use of a key identifier parameter. As an illustrative example, the encrypt request 202 may include information that is associated with a cryptographic key where that information does not necessarily specify an identifier of that cryptographic key. For instance, an entity submitting the encrypt request 202 may have an associated default key stored by, or otherwise accessible to, the cryptography service 200. As another example, an entity that submits the encrypt request 202 may not have an ability to specify which key to use to encrypt the plaintext 204. Other variants are also considered as being within the scope of the present disclosure.

An optional parameter that is specifiable in the encrypt request 202, in an embodiment, is a plaintext data integrity value type parameter 208, which is abbreviated as "PDIV type" 208 in FIG. 2. The plaintext data integrity value type parameter 208 may specify a mode of verification corresponding to a type of algorithm to be used generate information usable to verify validity of the plaintext 204. As an example, the cryptography service may be configured with the ability to perform multiple types of cryptographic hash algorithms, each corresponding to a different mode of verification, and the plaintext to data integrity validation type parameter 208 may enable a submitter of the request 202 to select from one of those algorithms to be used to generate a plaintext data integrity value. As an illustrative example, the plaintext to data integrity value type parameter 208 may specify SHA-256. The parameter may be specified by the string "SHA-256" or by information that corresponds to that particular algorithm. Another optional parameter in an embodiment in the encrypt request 202 is a plaintext data integrity value. In some embodiments, for example, a submitter of the request 202 may calculate a plaintext data integrity value of the plaintext 204 for the purpose of generating the encrypt request 202. A system submitting the encrypt request 202 may, for example, calculate a cryptographic hash of the plaintext 204 when generating the encrypt request 202. In this manner, when the cryptography service 200 receives the encrypt request 202 the cryptography service 200 may incorporate validation of the plaintext 204 as part of the fulfillment of the encrypt request 202. A sample process for processing an encrypt request 202 is described below.

Other parameters not illustrated in FIG. 2 may also be included as required or optional parameters in the encrypt request 202. As an example, some encryption algorithms allow for the use of additional authenticated data as an input into the cryptographic algorithms. As a result, an optional parameter in the encrypt request 202 may be a parameter that enables a submitter of the request 202 to specify additional authenticated data (AAD), such as described in the National Institute of Standards (NIST) Special Publications 800-38C and 800-38D, which are incorporated herein by reference. It should be noted that the parameters of the encrypt request and, of requests in general, may vary in accordance with various embodiments. For example, in some embodiments, parameters described herein as optional may be required. Similarly, some parameters described here as required may be optional. The same is true for other types of requests that are fulfillable by the cryptography service 200, such as requests that are described in more detail below. Further, the use of various parameters may vary in accordance with various embodiments. As an example, with various types of requests described herein, a plaintext data integrity value type and/or plaintext data integrity value may be passed in a request using AAD. In other words, AAD specified in a request may include a plaintext data integrity value type and/or a plaintext data integrity value. When so specified, separate parameters for plaintext data integrity values and plaintext data integrity value types may be omitted.

Other information may also be provided in the encrypt request 202 (and, generally, with other requests, such as those discussed below). For example, for authentication purposes, the encrypt request 202 (or another request) may include a digital signature generated by a system that generates the encrypt request 202. The digital signature may be a digital signature of a portion of the encrypt request so that the cryptography service 202 is able to verify the digital signature against that portion of the encrypt request 202. As illustrated in FIG. 2, when the cryptography service 200 fulfills the encrypt request, which may be on condition of the encrypt request 202 being properly authenticated (which may be determined by checking the validity of the digital signature). In addition, the encrypt request 202 and, generally, any request involving a cryptographic algorithm may include information specifying the cryptographic algorithm to be used in fulfilling the request.

When a request is determined to be properly authenticated, the cryptography service 200 may generate an encrypt response which may be a response to the encrypt request 202 that includes ciphertext that was generated in accordance with parameters in the encrypt request 202. The encrypt response 212 may include ciphertext 214, as described above. For example, the ciphertext 214 may also encrypt a plaintext integrity value 218. In various embodiments, the encrypt response 212 may lack a plaintext data integrity value 218 such as when a plaintext data integrity value type parameter 208 and a plaintext data integrity value parameter 210 are optional parameters of the encrypt request 202 and where such parameters are not specified.

Generally, the ciphertext 214 may be an encrypted set of information that, when decrypted, is in a structured format that enables the cryptography service 200 to determine what information is contained in the decrypted data. For example, before an encryption, the plaintext 216 and plaintext data integrity value 218, and possibly additional information, may be encoded using a structured format such as the protocol buffer format, which is a data interchange format utilized by Google Inc. Other formats including self-describing data formats may also be used. Generally, any structured format by which cryptography service is able to distinguish components of data resulting from decryption of the ciphertext 214 may be used.

Figure 3:
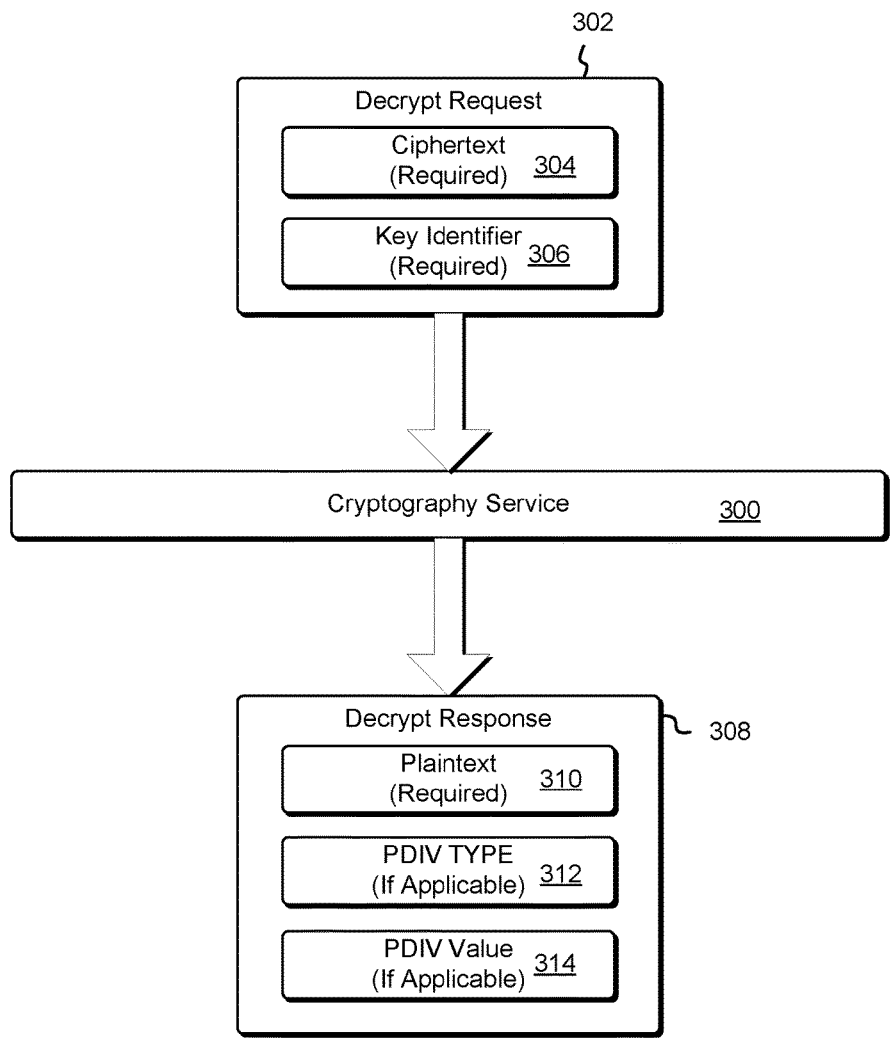
FIG. 3 shows an illustrative example of a cryptography service processing a decrypt request in accordance with at least one embodiment.

FIG. 3 shows an illustrative example of a cryptography service 300 and a particular type of request that may be submitted to an API provided the cryptography service 300. The cryptography service 300 may be a cryptography service, such as described above and in more detail below, in connection with FIG. 12. In the particular example of FIG. 3, the API of the cryptography service 300 allows for a submission of decrypt requests 302. In an embodiment, properly formatted decrypt request 302 are requests that, when received by the cryptography service 300, cause the cryptography service 300 to decrypt data in accordance with the decrypt request 302. Further, as noted above, decryption and generally the performance of other cryptographic operations may require fulfillment of other conditions, such as proper authentication of the request. In an embodiment, decrypt requests 302 submittable to the cryptography service 300 comprise two required parameters.

As illustrated in FIG. 3, the decrypt request 302 includes a ciphertext parameter 304 which includes or otherwise specifies ciphertext to be decrypted by the cryptography service 300 to thereby obtain plaintext. In an embodiment, the ciphertext parameter 304 includes the ciphertext, although as noted above, the information may otherwise be specified in a manner different from inclusion in the parameter. For example, the ciphertext parameter 304 may include a reference (e.g., uniform resource identifier (URI)) to ciphertext obtainable from a location outside of the decrypt request 302. Ciphertext in the ciphertext parameter 304 may also encrypt other information, such as a plaintext data integrity value type and/or a plaintext data integrity value. In an embodiment, the decrypt request 302 has a key identifier parameter 306 which the cryptography service 300 utilizes as a required parameter. The key identifier parameter 306 may be such as described above in connection with FIG. 2. Similarly, in various other embodiments, the key identifier parameter 306 may be optional or not specifiable, such as described above.

Other information may also be included in the decrypt request 302. For example, an optional parameter of the decrypt request 302 may be AAD. In addition the requirement of some parameters may be conditioned on the existence of other parameters or information contained therein. For example, if the ciphertext 304 was generated utilizing AAD, an AAD parameter may be a required parameter for the cryptography service 300 to successfully fulfill a decrypt request since decryption may not succeed absent valid AAD. As noted above, other information such as information described above may also be included with the decrypt request in accordance with various embodiments.

As illustrated in FIG. 3, when the cryptography service 300 receives a decrypt request 302 and when any conditions (e.g., a condition on authentication) for fulfillment of the decrypt request 302 are satisfied, the cryptography service 300 may generate a decrypt response 308 to the decrypt request 302. The information contained in the decrypt response 308 may vary in accordance with various embodiments and may vary in accordance with the information that was provided in the decrypt request 302 whose submission triggered the decrypt response 308. As illustrated in FIG. 3, the decrypt response 308 includes or otherwise specifies plaintext 310 corresponding to the ciphertext 304. If applicable to the particular decrypt request 302 that was submitted, the decrypt response 308 may include a plaintext data integrity value type 312 and, if applicable, a plaintext data integrity value 314. The decrypt response 308 may include a plaintext data integrity value type 312 and plaintext data integrity value 314. For example, when the ciphertext 304 encrypts a plaintext to data integrity value that is detected upon decryption of the ciphertext. As noted above, other information may be included with the decrypt response 308 in accordance with various embodiments.

Figure 4:
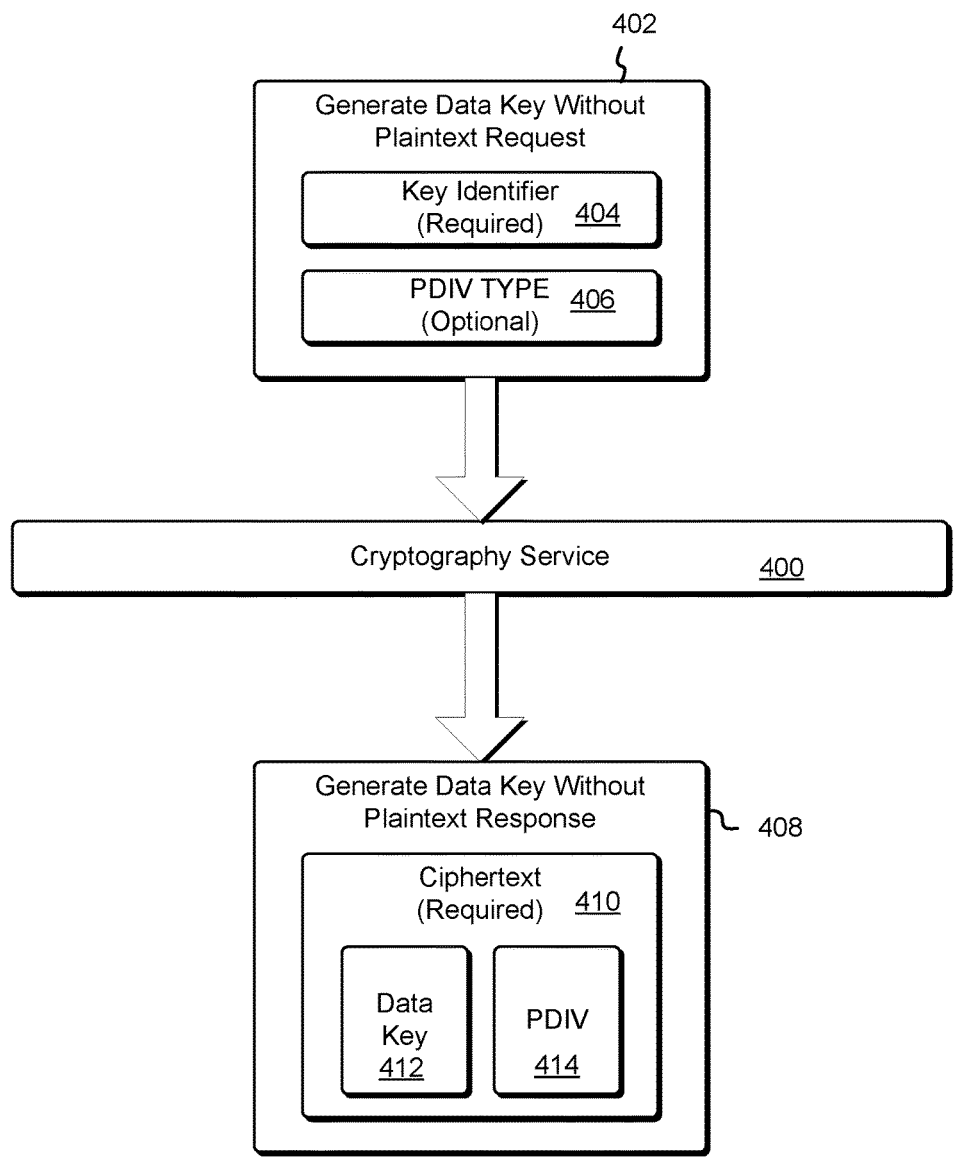
FIG. 4 shows an illustrative example of a cryptography service processing a request to generate a data key without plaintext in accordance with at least one embodiment.

FIG. 4 shows an illustrative example of a cryptography service 400 and a type of a request that may be submitted to an API provided by the cryptography service 400 in accordance with various embodiments. The cryptography service 400 may be a cryptography service described above and in more detail below. In the example of FIG. 4, an API of the cryptography service 400 allows for a generate-data-key-without-plaintext request 402. A generate-data-key-without-plaintext request 402 may be a request submittable to the cryptography service 400 to cause the cryptography service 400 to generate plaintext such as data key, encrypt that generated plaintext and provide ciphertext resulting from encryption of the generated plaintext. As with requests discussed above, the generate-data-key-without-plaintext request 402 may comprise multiple specifiable parameters to enable the cryptography service 400 to fulfill the request in accordance with the specified parameters.

As illustrated in FIG. 4, for example, the generate-data-without-plaintext request 402 may include a key identifier parameter 404 such as described above. In addition, the generate-data-key-without-plaintext request 402 may include a plaintext to data integrity value type parameter 406, as described above. In some embodiments the key identifier parameter 404 is a required parameter of the cryptography service 400, although, as noted, variations are considered as being within the scope of the present disclosure. Further as illustrated in FIG. 4 the plaintext data integrity value type parameter 406 in various embodiments is an optional parameter of the cryptography service 400, although, as noted, variations where the plaintext data integrity value type parameter 406 is required are considered as being within the scope of the present disclosure.

In an embodiment, when the cryptography service 400 receives a generate-data-key-without-plaintext request 402 and where any conditions on fulfillment of the request are fulfilled, the cryptography service 400 may generate a generate-data-key-without-plaintext response 408 to the generate-data-key-without-plaintext request 402. A generate-data-key-without-plaintext response 408 may be configured similarly to an encrypt response 212 described above in connection with FIG. 2. For example, the generate-data-key-without-plaintext response 408 may include ciphertext 410 which encrypts a data key 412 and if applicable a plaintext data integrity value 414. In comparison to FIG. 2, the data key 412 may correspond to the plaintext 216 described above in connection with FIG. 2. Other information may also be included in the ciphertext 410 such as AAD. It should be noted that while FIG. 4 shows a request 402 useable to generate a data key 412 by the cryptography service 400, variations include those by which generally plaintext is generated by the cryptography service 400 where that plaintext is not necessarily a data key but may be data that is used for other purposes. The plaintext may be, for example, a random number generated by the cryptography service 400 and, in some embodiments, the plaintext is not necessarily cryptographically generated but may be otherwise determined by the cryptography service 400.

Figure 5:
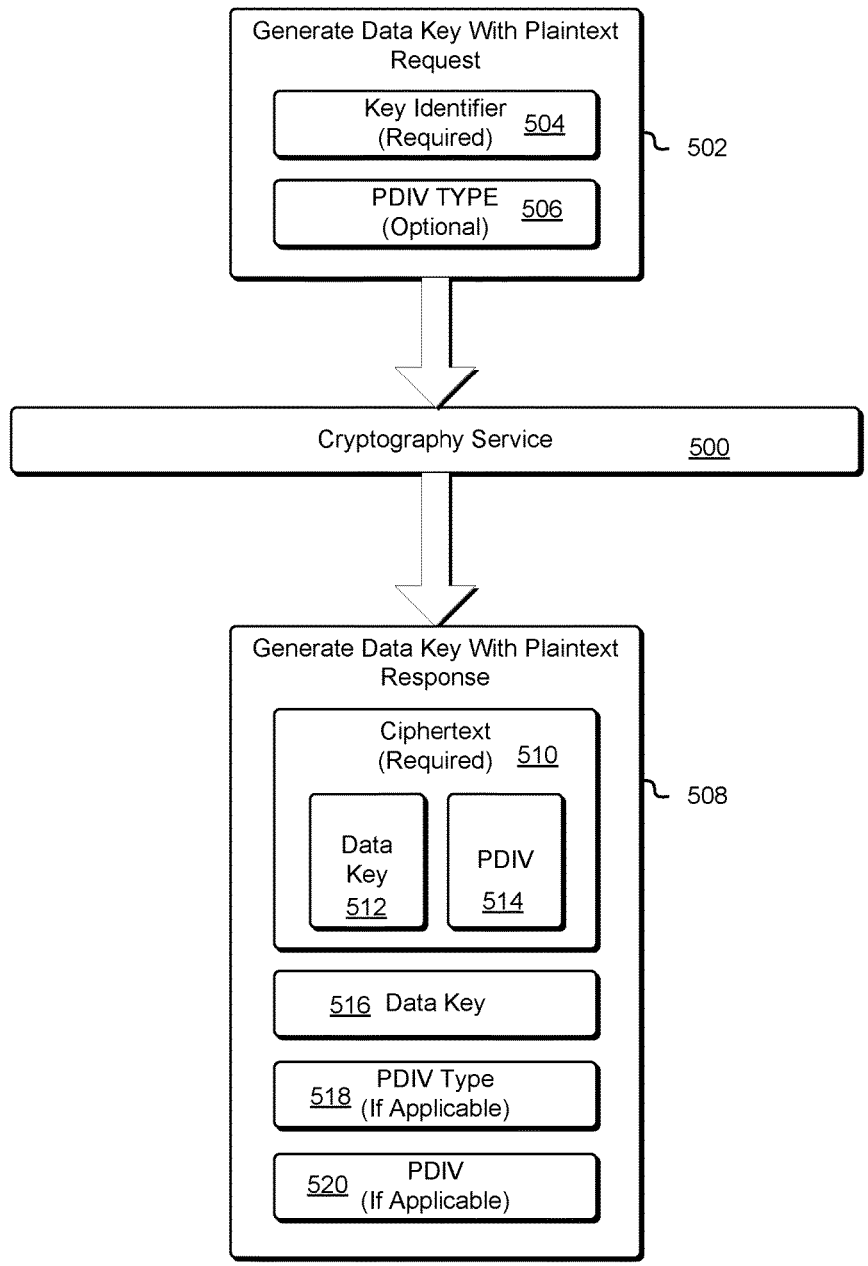
FIG. 5 shows an illustrative example of a cryptography service processing a request to generate a data key with plaintext in accordance with at least one embodiment.

In some embodiments, a cryptography service also provides the ability to, through the submission of API calls, cause the cryptography service to generate plaintext, such as a data key, and to provide that data key in plaintext form which may be over a secured channel such as an encrypted communication channel. FIG. 5, accordingly, shows an illustrative example of a cryptography service 500 and a particular request which may be submitted to an API of the cryptography service 500 to cause the cryptography service 500 to generate and provide plaintext data which, in this particular example, is a data key although other types of plaintexts are considered as being within the scope of the present disclosure. The cryptography service 500 may be a cryptography service such as described above and in more detail below.

In an embodiment the cryptography service 500 provides an API through which a generate-data-key-with-plaintext request 502 is submittable. The generate-data-key-without-plaintext request 502 may be configured similarly to the generate-data-key-without-plaintext request 402 described above in connection with FIG. 4. For example, as illustrated in FIG. 5, the generate-data-key-with-plaintext request 502 may include a key identifier parameter 504 and a plaintext data integrity value type parameter 506, such as described above in connection with FIG. 4. The generate-data-key-with-plaintext request 502 may, however, be configured differently from the generate-data-key-without-plaintext request 402 so as to enable the cryptography service 500 to distinguish between the two request types in embodiments where the cryptography service 500 is operable to fulfill both request types.

As illustrated in FIG. 5, when the cryptography service 500 receives a generate-data-key-with-plaintext request 502 and when any conditions for fulfillment of the request 502 are fulfilled, the cryptography service 500 may generate a generate-data-key-with-plaintext response 508. The generate-data-key-with-plaintext response 508 may include various information in a structured format such as describe above. For example, the generate-data-key-with-plaintext response 508 may include ciphertext 510 such as described above in FIG. 4. For example, the ciphertext 510 of the generate-data-key-with-plaintext response 508 may include a data key 512 and, if applicable, a plaintext data integrity value 514, such as described above. Differing from the generate-data-key-without-plaintext request 402 of FIG. 4, the generate-data-key-with-plaintext response 508 may include additional information, such as a data key 516 which, in some embodiments, is generated by the cryptography service 500 in connection with fulfillment of the generate-data-key-with-plaintext request 502. Other information may also be included in the generate-data-key-with-plaintext response 508 such as a plaintext data integrity value type 518 and/or a plaintext data integrity value 520 in circumstances when such information is applicable. Other information such as AAD may also be included in the generate-data-key-with-plaintext response 508.

In some embodiments, a cryptography service is able to perform composite operations such as operations that involve re-encrypting data, such that data encrypted under a first cryptographic key is decrypted by the cryptography service and re-encrypted under a second cryptographic key different from the first cryptographic key. Such operations may be desired as part of a key rotation process performed by the cryptography service or another system or when potential compromise of a cryptographic key has been detected and re-encryption is performed as an additional security measure to prevent unauthorized access to data. Generally, re-encryption may be desirable in a wide range of circumstances when changing the key under which data is encrypted plays a role in enhanced data security.

Figure 6:
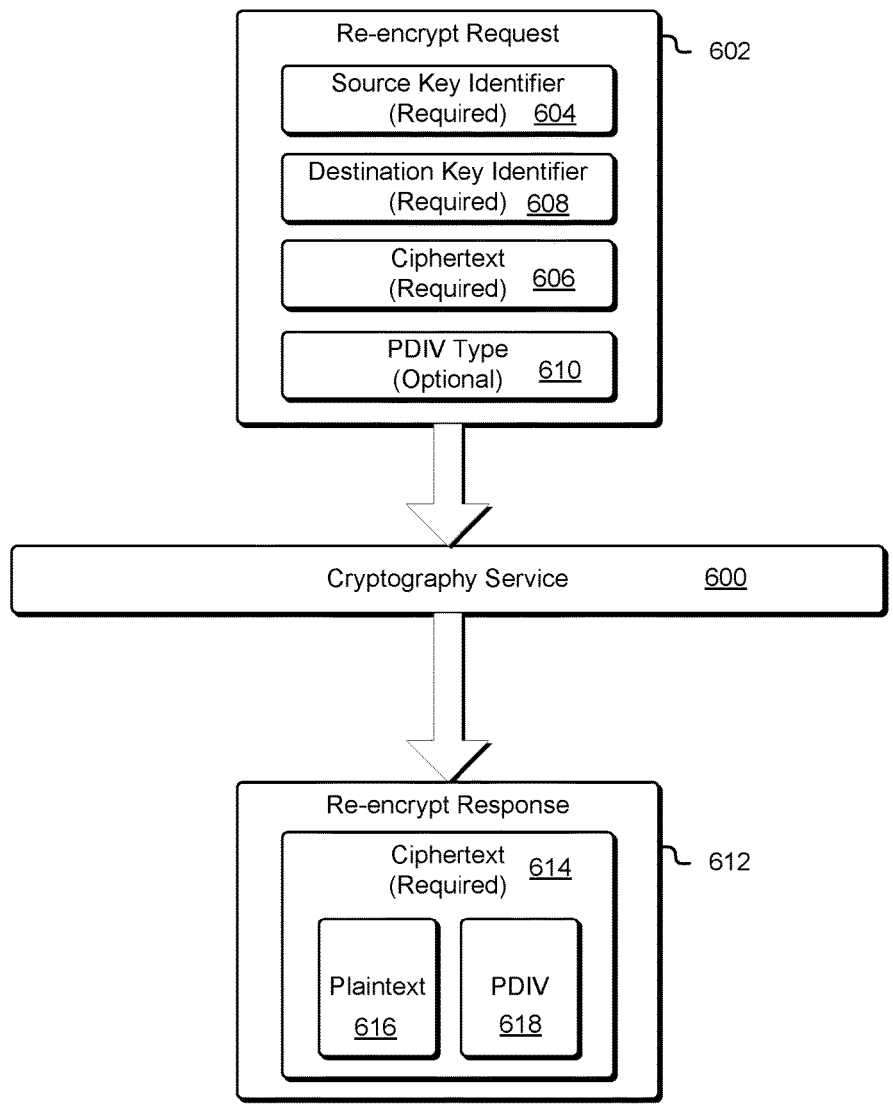
FIG. 6 shows an illustrative example of a cryptography service processing a request to re-encrypt in accordance with at least one embodiment.

FIG. 6 accordingly shows an illustrative example of a cryptography service 600 which provides an API through which requests may be made to cause the cryptography service 600 to re-encrypt data. The cryptography service 600 may be as described above and in more detail below. As illustrated in FIG. 6, the cryptography service 600 provides an API through which a re-encrypt request 602 is submittable. The re-encrypt request 602 may be a request that when properly formatted and when satisfying any conditions for fulfillment such as authentication causes the cryptography service 600 to re-encrypt data specified in the re-encrypt request 602 such as described above and as described in more detail below. In an embodiment the re-encrypt request 602 includes various parameters, some of which are required by the cryptography service and some of which are optional. Although, as noted, the required and optional nature of various parameters in the re-encrypt request 602 may vary in accordance with various embodiments.

In an embodiment, the re-encrypt request 602 includes a source key identifier parameter 604 which, in this example, is a required parameter. The source key identifier parameter 604 may specify a cryptographic key that was used to encrypt ciphertext parameter 606 provided in the re-encrypt request 602. The re-encrypt request 602, in this example, also includes a destination key identifier parameter 608 as a required parameter. The destination key identifier parameter 608 may specify a cryptographic key to be used to encrypt data as part of fulfillment of the re-encrypt request 602. The re-encrypt request 602 may include a ciphertext parameter 606 which includes or otherwise specifies ciphertext to be re-encrypted by the cryptography service 600.

As illustrated in FIG. 6, an optional parameter of the re-encrypt request may also include a plaintext data integrity value type parameter 610 which specifies a type of plaintext data integrity value to be generated (e.g., by specifying an algorithm to be used to generate the plaintext data integrity value) by the cryptography service 600 as part of fulfillment of the re-encrypt request 602 such as described in more detail below. Other information may also be included in the re-encrypt request 602 in various parameters. For example, if applicable a plaintext data integrity value type and/or a plaintext data integrity value may be included in the re-encrypt request 602 so as to enable the cryptography service 600 to verify validity of plaintext determined as part of fulfillment of the re-encrypt request 602. AAD may also be included in the re-encrypt request 602, where applicable, which may depend on whether ADD was used in the ciphertext specified by the ciphertext parameter 606.

As illustrated in FIG. 6, when the cryptography service 600 receives a re-encrypt request 602 and when any conditions on fulfillment of the re-encrypt request 602 are fulfilled the cryptography service 600 may generate a re-encrypt response 612. The re-encrypt response 612 may be structured similarly to an encrypt response 212 such as described above in connection with FIG. 2. For example, as illustrated in FIG. 6 the re-encrypt response 612 may include ciphertext 614 encrypted under the destination key specified by the destination key identifier 608 of the re-encrypt request 602. The ciphertext 614 may include plaintext 616 and if applicable a plaintext data integrity value 618. Other information may also be included in the ciphertext such as AAD and/or a plaintext data integrity value type. Other variations are also considered to be within the scope of the present disclosure.

Figure 7:
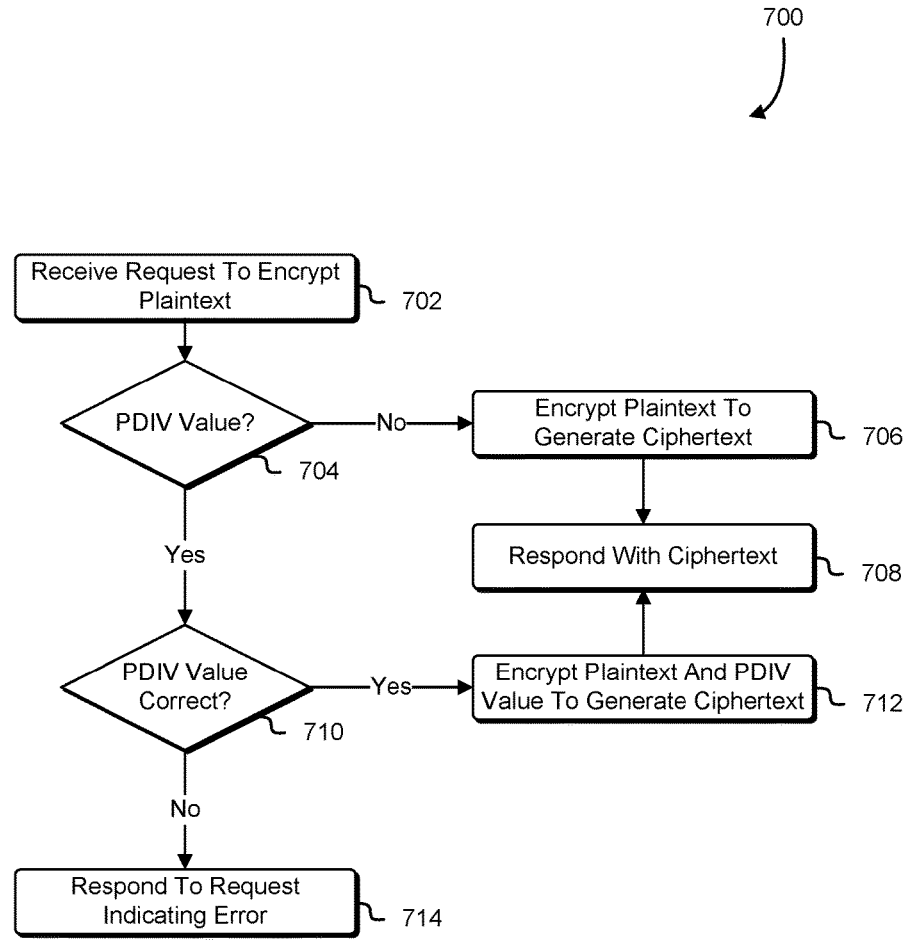
FIG. 7 shows an illustrative example of a process for processing a request to encrypt plaintext in accordance with at least one embodiment.

FIGS. 7-11 show various processes for processing requests in accordance with various embodiments. Some or all of the processes described below in connection with FIGS. 7-11 and variations thereof may be performed by any suitable system such as by a security module of a cryptography service, as described below. It should be noted however that in a distributed system some or all operations of the processes described below in connection with FIGS. 7-11 may be performed by different components in the distributed system. Turning to FIG. 7, which shows an illustrative example of a process 700 for processing a request to encrypt plaintext, the process 700 includes receiving 702 a request to encrypt plaintext. The request may be received over a network in which the system performing the process 700 is located and may be an application programming interface request to the system performing the process 700. The request to encrypt plaintext that is received may be an encrypt request 202 such as described above in connection with FIG. 2.

Returning to FIG. 7, upon receipt 702 of the request to encrypt plaintext, the process 700 may include determining 704 whether the request that was received 702 included a plaintext data integrity value (e.g., by checking whether a plaintext data integrity value parameter of the request was populated). If it is determined 704 that the request did not include a plaintext data integrity value, the process 700 may include encrypting 706 plaintext that was received in the request. The plaintext may be encrypted to fulfill the request (or another request whose fulfillment includes encryption) using a cryptographic algorithm, as described below. In some embodiments an authenticated encryption mode of a block cipher is used to encrypt the plaintext which provides an assurance of plaintext integrity since, if the plaintext is corrupted during the encryption, the encryption will fail. Further, when authenticated encryption is used to encrypt data that includes both a plaintext and a plaintext data integrity value and possibly additional data, such as a plaintext data integrity value type (as described below), additional plaintext integrity is achieved by the cumulative effect of the authenticated encryption and the plaintext data integrity value.

A response with the ciphertext may be generated and the process 700 may accordingly include responding 708 to the request that was received 702 with the ciphertext. If, however, it is determined 704 that the request that was received did in fact include a plaintext data integrity value the process 700 may include determining 710 whether the plaintext data integrity value was correct (i.e., whether the plaintext data integrity value matches the plaintext). In some examples, determining whether the plaintext data integrity value was correct may be performed by generating a reference plaintext data integrity value and may be performed by generating a plaintext data integrity value of the plaintext that was received in the request and determining whether the reference plaintext data integrity value equals the plaintext data integrity value that was received in the request. Generally, the manner by which a plaintext data integrity value is verified may vary in accordance with various embodiments and in general, verification of a plaintext data integrity value may include determining whether plaintext matches the plaintext data integrity value, which may or may not include determining a reference plaintext data integrity value and checking whether that reference plaintext data integrity value is equal to another plaintext data integrity value.

If it is determined 710 that the plaintext data integrity value that was received in the request is correct, the process 700 may include encrypting 712 the plaintext and the plaintext data integrity value to generate ciphertext. As discussed above, once ciphertext is generated, the process 700 may include responding 708 to the request with the ciphertext. However, if it is determined 710 that the plaintext data integrity value is incorrect, the process 700 may include responding 714 to the request with an indication that there was an error. The indication may for example indicate that the plaintext data integrity value did not match the plaintext. In some embodiments, a response indicating error may indicate a reason for the error and/or may include a reference plaintext data integrity value that was calculated by the system performing the process 700 for the purpose of troubleshooting. A client that submitted the request to encrypt the plaintext may retry the request upon receipt of a response indicating an error in order, for example, to have the request fulfilled.

Figure 8:
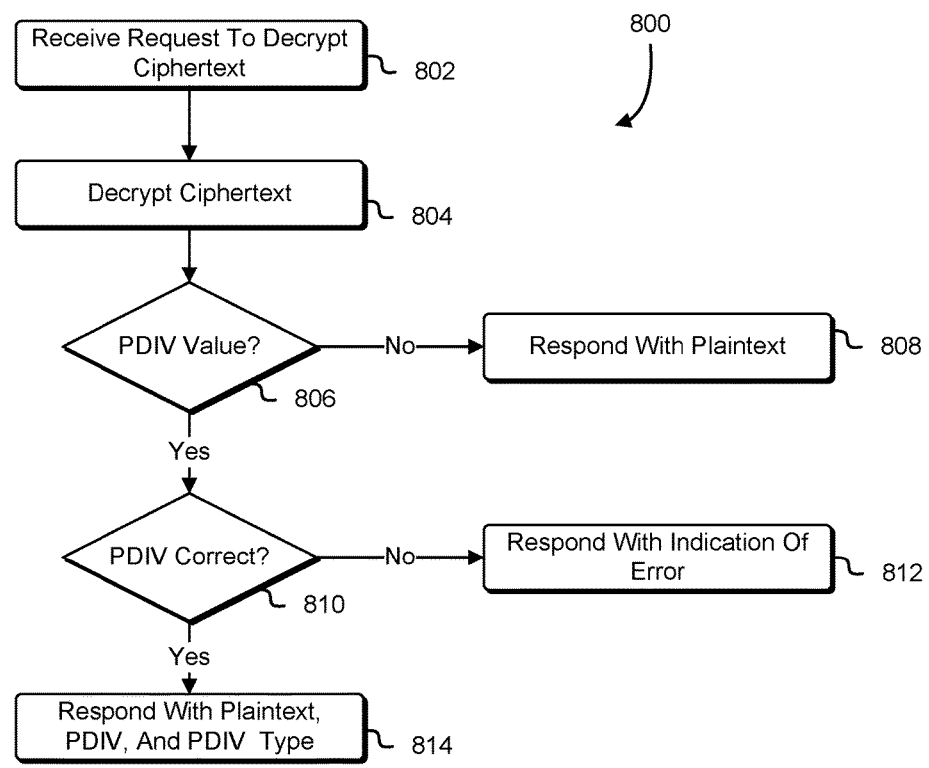
FIG. 8 shows an illustrative example of a process for processing a request to decrypt ciphertext in accordance with at least one embodiment.

FIG. 8 shows an illustrative example of a process 800 for fulfilling a request to decrypt ciphertext. In an embodiment, the process 800 includes receiving 802 a request to decrypt ciphertext. The request to decrypt ciphertext may be a decrypt request 302 such as described above in connection with FIG. 3. Returning to FIG. 8, upon receipt 802 of the request to decrypt ciphertext, the process 800 may include decrypting 804 the ciphertext. The ciphertext may be decrypted in various ways in accordance with various embodiments. For example, a parameter of the request may specify a cryptographic algorithm to use for decryption of the ciphertext. In addition, as noted, a request to decrypt ciphertext may specify a cryptographic key to use for the decryption to enable a system performing the process 800 to select the specified cryptographic key from multiple cryptographic keys accessible to the system. Decryption of the ciphertext may yield information in plaintext (cleartext) form, which, in some embodiments, may include a plaintext and, in some instances, a plaintext data integrity value.

Accordingly, in an embodiment as illustrated in FIG. 8, the process 800 includes determining 806 whether the decrypted ciphertext includes a plaintext data integrity value. As noted above, data that was encrypted originally may be arranged in a structured format so as to enable a system performing the process 800 to detect whether a plaintext data integrity value has been included. Accordingly, determining 806 whether there is a plaintext data integrity value may include processing the decrypted ciphertext in accordance with the structured format by which the data was encrypted. If it is determined 806 that the decrypted ciphertext does not include a plaintext data integrity value, the process 800 may include responding 808 to the request that was received 802 with the plaintext.

If, however, it is determined 806 that the decrypted ciphertext includes a plaintext data integrity value, the process 800 may include determining 810 whether the plaintext data integrity value is correct (i.e., generally whether the plaintext data integrity value matches the plaintext), such as described above. For example, an algorithm may be performed to determine whether the plaintext obtained from the decrypted ciphertext matches the plaintext data integrity value also obtained from the decrypted ciphertext. In some examples, determining where there is a match may include generating a reference data plaintext data integrity value and determining whether that generated reference plaintext data integrity value equals the plaintext data integrity value that was obtained from the decrypted ciphertext. If it is determined 810 that the plaintext data integrity value is not correct, the process 800 may include responding 812 to the request that was received 802 with an indication of an error, such as described above. If, however, it is determined 810 that the plaintext data integrity value is correct, the process 800 may include responding 814 to the request that was received 802 with the plaintext, the plaintext data integrity value and the plaintext data integrity value type.

Numerous variations of the process 800 are considered to be within the scope of the present disclosure. For example, in some embodiments a response is provided without determining 810 whether the plaintext data integrity value is correct. A system performing such a variation of the process 800 may, for example, simply provide the plaintext data integrity value that was obtained from the ciphertext and a client that submitted the request, or another computer system, may utilize that plaintext data integrity value and verify the plaintext data integrity value itself. Further, in some embodiments the plaintext data integrity value type is not included in the response when it is determined that the plaintext data integrity value is correct. Such may be the case, for example, when a default algorithm for determining plaintext data integrity values is used or when a plaintext data integrity value type is otherwise determinable. Other information may also be included with the response, if applicable, such as AAD.

Figure 9:
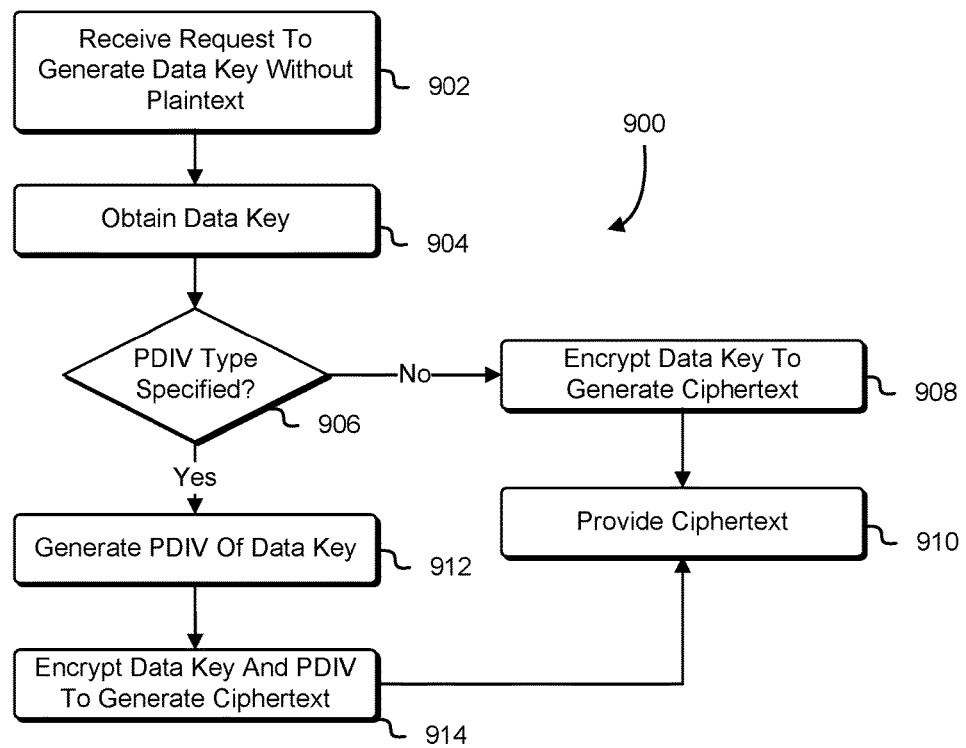
FIG. 9 shows an illustrative example of a process 900 for processing a request to generate a data key without plaintext in accordance with at least one embodiment.

FIG. 9 shows an illustrative example of a process 900 for processing a request to generate a data key without plaintext. In an embodiment, the process 900 includes receiving 902 a request to generate a data key without plaintext. The request to generate a data key without plaintext may be a generate-data-key-without-plaintext request 402 such as described above in connection with FIG. 4. Returning to FIG. 9, upon receipt 902 of the request to generate a data key without plaintext, the process 900 may include obtaining 904 a data key. The data key may be obtained in various ways in accordance with various embodiments. In some examples, the data key is generated (e.g., using a random number generator and/or cryptographic key derivation function). In other examples, a system performing the process 900 may store a set of pre-generated data keys and select from the set. Generally, any way by which a data key may be obtained is considered as being within the scope of the present disclosure.

Upon obtaining 904 the data key, the process 900 may include determining 906 whether the request to generate the data key without plaintext specified a plaintext data integrity value type. If it is determined 906 that the request to generate the data key without plaintext did not specify a plaintext data integrity value type, the process 900 may include encrypting 908 the data key to generate ciphertext. The data key may be encrypted in various ways in accordance with various embodiments, such as in accordance with one or more parameters specified in the generate data key without plaintext request that was received 902. For example, the data key may be encrypted using a cryptographic key specified in the request.

If it is determined 906 that a plaintext data integrity value type was specified in the request, the process 900 may include generating 912 a plaintext data integrity value of the data key. The plaintext data integrity value may be generated 912 in various ways in accordance with various embodiments, such as by generating a cryptographic hash of the data key and/or otherwise processing the data key to obtain information usable to verify validity of the data key. Once the plaintext data integrity value has been generated 912 the process 900 may include encrypting 914 the data key and plaintext data integrity value to generate ciphertext. The data key and plaintext data integrity value may be organized in a structured format with other information, such as a plaintext data integrity value type, in order to be placed in a state for encryption such that if the ciphertext is decrypted, the components of information within the ciphertext are detectable and distinguishable from other information in the ciphertext.

Once the ciphertext has been generated, as noted above, the ciphertext may be provided 910 in response to the request that was received. As with all processes described herein, numerous variations of the process 900 are considered as being within the scope of the present disclosure. For example, when the ciphertext encrypts a plaintext data integrity value, a system performing the process 900 may decrypt the ciphertext that was generated and verify the plaintext data integrity value, providing the ciphertext in response only if the plaintext data integrity value is verified as correct. In this manner, the system performing the process 900 verifies that the plaintext data integrity value it generated is correct and it has not been affected before the encryption process has completed. Further, other information may also be included in the ciphertext such as AAD and/or a plaintext data integrity value type. Also, as noted above, processes described herein and variations thereof may include additional operations, such as verifying that a request received is properly authenticated (e.g., by way of verification of a digital signature of the request). Generally, for a process, fulfillment of the request and the manner by which a process is performed may be dependent on one or more conditions (e.g., authentication) enforced by a system performing the process.

Figure 10:
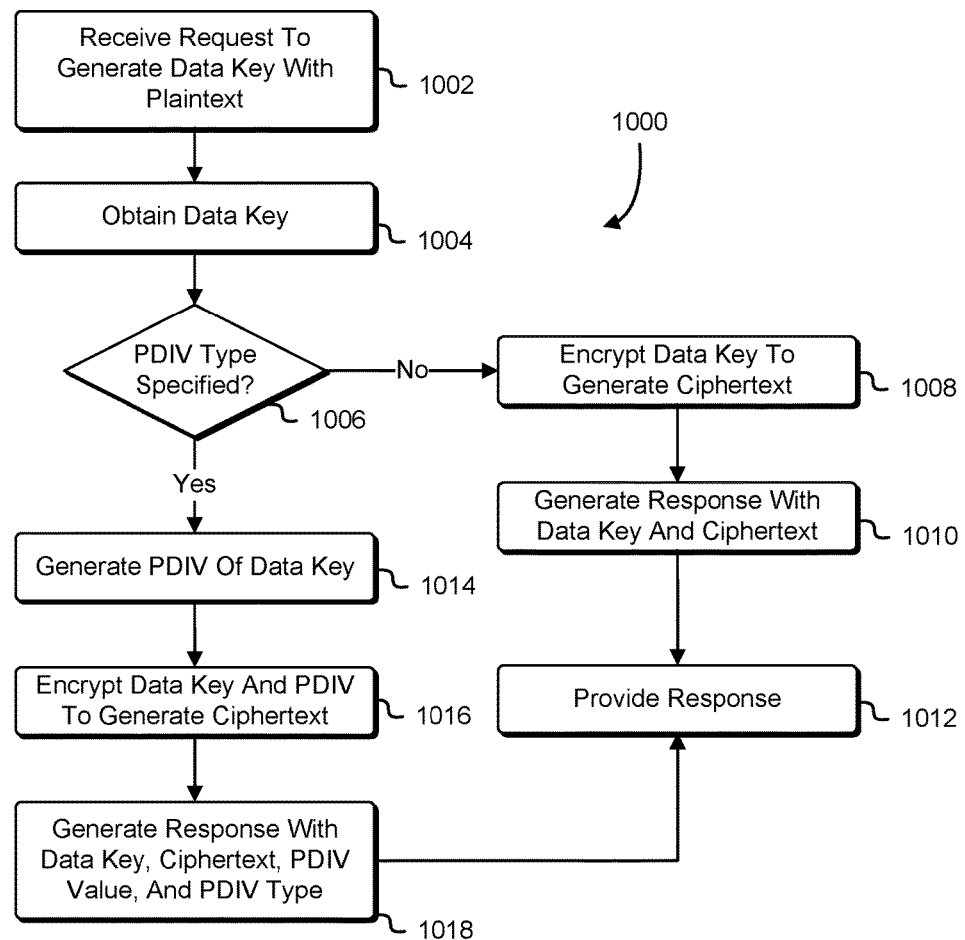
FIG. 10 shows an illustrative example of a process 1000 for processing a request to generate a data key with plaintext in accordance with at least one embodiment.

FIG. 10 shows an illustrative example of a process for processing a request to generate a data key with plaintext in accordance with an embodiment. The request to generate a data key with plaintext may be the generate-data-key-with-plaintext request 502 described above in connection with FIG. 5. Returning to FIG. 10, in an embodiment, the process 1000 includes receiving 1002 a request to generate a data key with plaintext. The process 1000 may further include obtaining 1004 a data key such as described above, such as by generating the data key. A determination may be made 1006 whether the request to generate the data key with plaintext specifies a plaintext data integrity value type. If it is determined 1006 that the request to generate the data key with plaintext did not specify a plaintext data integrity value type, the process 1000 may include encrypting 1008 the data key that was obtained 1004 to generate ciphertext. A response with a data key in ciphertext may then be generated 1010 and the response may be provided 1012 such as described above. While FIG. 10 separately illustrates generating a response that has been provided, other processes described herein may also include the operation of generating a response that is provided, even though such is not explicitly called out in the figures for the purpose of maintaining clarity. Generally, all processes described herein may include generation of the response that is transmitted.

If it is determined during performance of the process 1000 that the request to generate a data key with plaintext did not specify a plaintext data integrity value type the process 1000 may include generating 1014 a plaintext data integrity value of the data key that was obtained 1004. The plaintext data integrity value may be generated 1014 such as described above, for example, by calculating a cryptographic hash of the data key. The data key and plaintext data integrity value may be encrypted 1016 to generate ciphertext such as described above. As noted, the data key and plaintext data integrity value may be organized in a structured format, possibly with additional information such as a plaintext data integrity value type, for the purpose of encryption 1016. A response with the data key ciphertext plaintext data integrity value and plaintext data integrity value type may then be generated 1018 and the response may be provided 1012. As with all responses described herein the response may be generated in accordance with a protocol by which requests and responses are transmitted and information in the response may be organized in accordance with a structured format such as JavaScript Object Notation (JSON) format. Once the response has been generated 1018 the response may be provided 1012. Other operations may also be performed in accordance with performance of the process 1000 such as decrypting the ciphertext and checking a plaintext data integrity value extracted from the decrypted ciphertext as a condition for providing a response with a data key, ciphertext, plaintext data integrity value and plaintext data integrity value type. Other information may also be included such as AAD.

Figure 11:
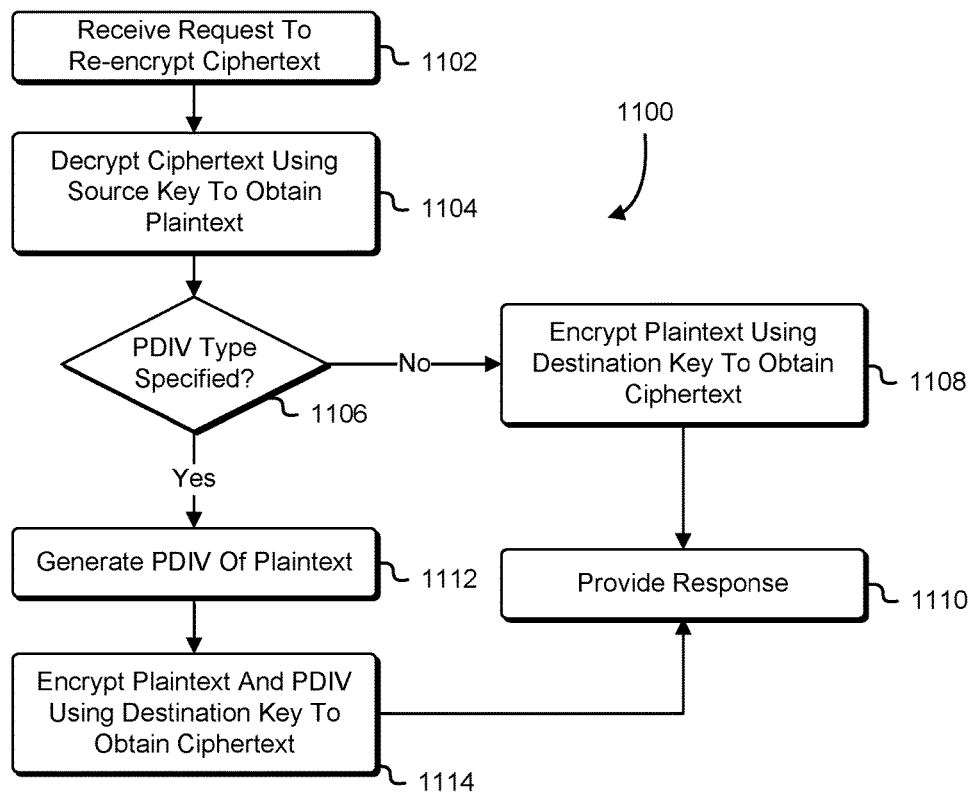
FIG. 11 shows an illustrative example of a process for processing a request to re-encrypt ciphertext in accordance with at least one embodiment.

FIG. 11 shows an illustrative example of a process for processing a request to re-encrypt ciphertext. The process to re-encrypt ciphertext may be a re-encrypt ciphertext request 602 described above in connection with FIG. 6. Returning to FIG. 11, the process 1100 may include receiving 1102 a request to re-encrypt ciphertext where the request may be received such as described above. The ciphertext received 1102 in the request may be decrypted 1104 using a source key to obtain plaintext. The source key may be a key usable to decrypt the ciphertext that was received. For example, the source key may be a symmetric key that was used to generate the ciphertext. As another example, the source key may be a private key corresponding to a public key that was used to generate the ciphertext that was received.

Once the ciphertext has been decrypted 1104 the process 1100 may include determining 1106 whether a plaintext data integrity value type has been specified, such as described above. If it is determined 1106 that a plaintext data integrity value type was not specified in the decrypt data 1104 ciphertext, the process 1100 may include encrypting 1108 the plaintext using a destination key to obtain ciphertext. The destination key may be a cryptographic key that is different from the source key. The destination key may be a symmetric cryptographic key or an asymmetric cryptographic key such as a private key of a public-private key pair. Once the plaintext has been encrypted 1108 a response may be provided 1110 to the request that was received 1102. If, however, it is determined 1106 that the decrypted ciphertext specifies a plaintext data integrity value type, the process 1100 may include generating 1112 a plaintext data integrity value of plaintext obtained from the ciphertext, such as described above, for example, by calculating a cryptographic hash of plaintext obtained from the decrypted ciphertext. The plaintext and plaintext data integrity value may be encrypted 1114 using a destination key to obtain the ciphertext. As noted above, a response may be generated and then provided 1110 to the request that was received 1102. As noted above, ciphertext may also include other information such as a plaintext data integrity value type and/or AAD.

As noted above, numerous processes and variations of processes involve verification of information usable to verify validity of plaintext (e.g., plaintext data integrity value). In some embodiments, one or more correction algorithms may be performed in the event information verification of the validity of a plaintext is unsuccessful. For example, another copy of plaintext and/or ciphertext may be obtained from another data storage location and a reattempt at verification may be made. As another example, a process may be performed whereby bits of the plaintext and/or information usable to verify validity of the plaintext are flipped to search for a correct version of the plaintext and/or information usable to verify validity of the plaintext. For instance, different versions of the plaintext, each with a different bit flipped (e.g., changed from zero to one or vice versa) may be checked against the plaintext data verification value until a match is found, if a match is found. In this manner, corruption caused by a single bit flip may be corrected without losing the data.

More computationally intensive operations may also be performed. For example, different versions of the plaintext, each with a different set of N bits flipped (with N a positive integer) may be checked against the plaintext data verification value until a match is found (if a match is found). Different versions of the plaintext may be searched in this manner, starting with searching all possible single bit flips, moving to all combinations of two-bit flips if no single bit flip is found to be the cause of corruption and, if no cause of the corruption is found, moving to all three-bit flips, and so on. The amount of possible bit flip combinations searched may be tunable and may depend on computational abilities, an importance assigned to the plaintext (e.g., the importance of data encrypted under the plaintext when the plaintext is a data key), and the like.

Other variations are also considered as being within the scope of the present disclosure. For example, in some embodiments, plaintext is first erasure coded before encrypted, resulting in plaintext comprising N parts, where N is a positive integer. In other words, the plaintext is first transformed into another plaintext resulting from the erasure coding. A plaintext data integrity value or other information usable to verify validity of the plaintext may be calculated for the plaintext prior to the erasure coding and used, such as described. In some embodiments, another plaintext data integrity value or other information usable to verify plaintext validity may be calculated and used, such as described above, for the post-erasure coding plaintext. A result of the erasure coding may be that only M out of N parts are sufficient for constructing the plaintext, where M is a positive integer smaller than N.

Verification of a plaintext may include selecting a collection of the M parts, reconstructing the plaintext, and checking the plaintext data integrity value. Failure of the reconstructed plaintext to match a plaintext data integrity value may cause a computer system to select a different collection of M parts and recheck whether the new reconstructed plaintext matches the plaintext data verification value. Different collections of M parts may be selected and used to reconstruct the plaintext until a reconstructed plaintext matches the plaintext data verification value, if a match is found.

Figure 12:
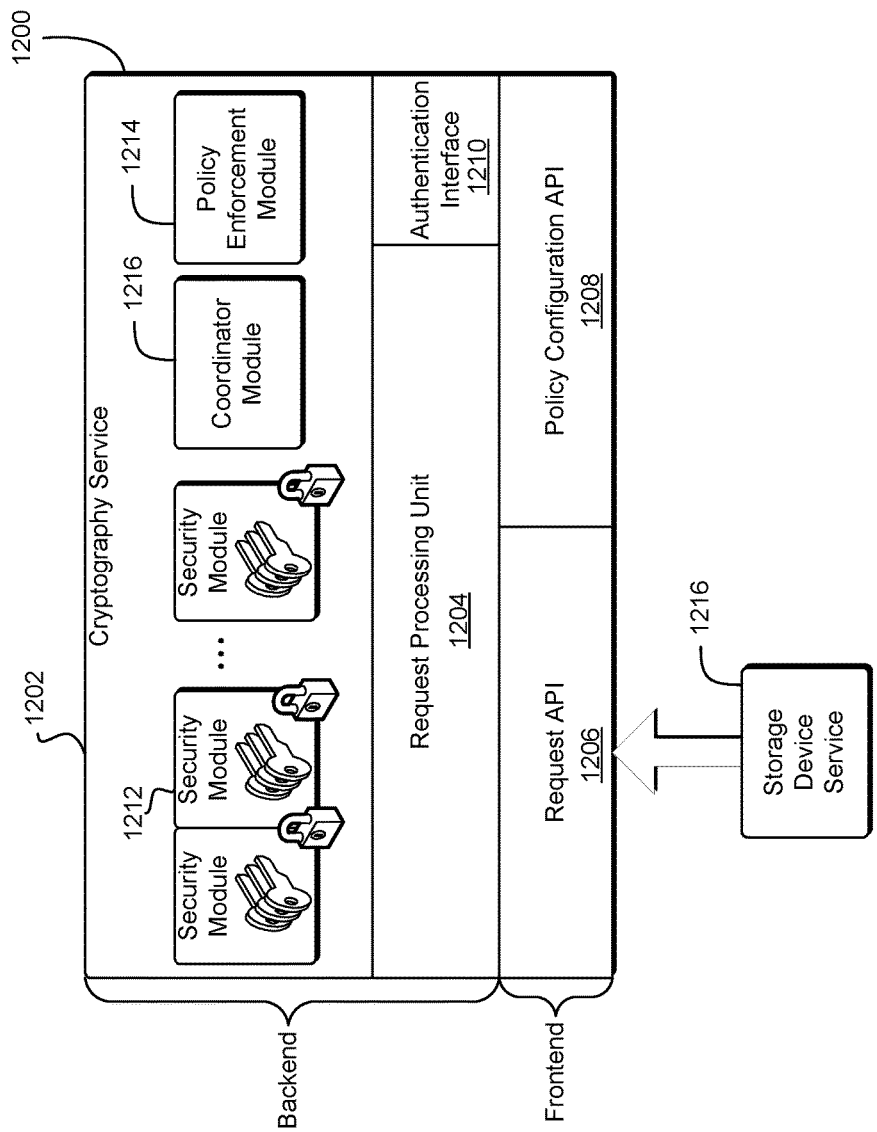
FIG. 12 shows an illustrative example of an environment in which various embodiments may be practiced.

As discussed above, various embodiments of the present disclosure are directed to providing cryptography services. Cryptography services may be provided by a cryptography service system such as described above. FIG. 12 accordingly shows an illustrative example of a cryptography service 1200 in accordance with various embodiments. As illustrated in FIG. 12 and as discussed above, the cryptography service 1200 is logically comprised of a frontend system and a backend system. Both the frontend system and the backend system may be implemented by one or more computer systems configured to perform operations described herein. For example, as illustrated in FIG. 12, the frontend system of the cryptography service 1200 implements a request API and a policy configuration API. The request API, in an embodiment, is an API configured for requesting cryptographic and other operations to be performed by the cryptography service. Thus, requests may be made to the frontend system via the request API in order for such cryptographic operations to be performed by the cryptography service.

The request API may be configured with the following example, high-level, requests available, which may include different sets parameters (e.g., plaintext data integrity values and/or plaintext data integrity value types), some of which may be optional parameters, such as described above in connection with the description of the above figures:

CreateKey(KeyID)
Encrypt(KeyID, Data, [AAD])
Decrypt(KeyID, Ciphertext, [AAD])
Shred(KeyID)
ReKey(Ciphertext, OldKeyID, NewKeyID)

A CreateKey(KeyID) request, in an embodiment, causes the cryptography service to create a key identified by the KeyID identified in the request. Upon receipt of a request, the cryptography service may generate a key and associate the key with the KeyID. It should be known that KeyID's may be but are not necessarily unique identifiers. For instance, a KeyID may identify a family of keys. For example, in some embodiments, key rotation is performed. Key rotation may involve replacing keys with other keys to prevent collection of enough decrypted data to allow practical cracking of a cipher used. If performed at the direction of an entity different from the cryptography service, use of the CreateKey(KeyID) request may cause the cryptography service to create a new key to replace an old key identified by the KeyID. The old key may remain identified by the KeyID, but may, for instance, be only used for decryption (of data that has already been encrypted using the old key) and not for future encryption. As another example, in some embodiments, users of the cryptography service provide their own key identifiers and there is a possibility that two different customers may provide the same identifier. In such instances, the identifier may not uniquely identify a key or even uniquely identify a family of keys. Various measures may be in place to address this. For example, an identity or other information associated with a user of the cryptography service may be used to identify the proper key or family of keys. In still other embodiments the cryptographic service may assign a KeyID randomly, sequentially, or using any other method.

It should be noted that, when a KeyID does not uniquely identify a key, various systems may be in place to enable proper functionality. For example, in various embodiments, a family of keys identified by a KeyID is finite. If a decryption operation using a key identified by a KeyID is requested, additional data (e.g., a time stamp of when the encryption was performed) may enable determining the proper key to use. In some embodiments, ciphertexts may include information indicating a key version. In some embodiments, all possible keys are used to provide different decryptions of the data. Since there are a finite number of keys, the proper decryption may be selected from those provided. In some embodiments, decryption with a key is performed in a manner that enables the cryptographic service to detect that the ciphertext was not generated based at least in part on the key, such as by using authenticated encryption. Other variations are also considered as being within the scope of the present disclosure.

An Encrypt(KeyID, Data, [AAD]) request may be used to cause the cryptography service to encrypt the specified data using a key identified by the KeyID. Additional Authenticated Data (AAD) may be used for various purposes and may be data that is not necessarily encrypted, but that is authenticated, e.g., by an electronic signature, a message authentication code or, generally, a keyed hash value included with the AAD. In some embodiments, the ciphertext is generated including at least a portion of the AAD. In some other embodiments, the AAD is provided separately during decryption. In some other embodiments, the AAD is generated at decryption time based at least in part on the request and or other metadata such that decryption will only succeed when the metadata passes. In some embodiments, policy may constrain whether a cryptographic operation can be performed with respect to particular AAD. Processing of Encrypt(KeyID, Data, [AAD]) requests may require, by programming logic and/or policy enforced by the cryptography service, both that the AAD contain particular values and that the AAD be authentic (e.g., not modified since original transmission). Similarly, a Decrypt(KeyID, Ciphertext, [AAD]) request may be used to cause the cryptography service to decrypt the specified ciphertext using a key identified by the KeyID. The AAD in the Decrypt(KeyID, Ciphertext, [AAD]) request may be used such as described above. For instance, processing of the Decrypt(KeyID, Ciphertext, [AAD]) may require, by programming logic and/or policy enforced by the cryptography service, both that the AAD contain particular values and that the AAD be authentic (e.g., not modified since original transmission).

The Shred(KeyID), in an embodiment, may be used to cause the cryptography service to electronically shred a key or family of keys identified by the specified KeyID. Electronic shredding may include making the key no longer accessible. For example, use of the Shred(KeyID) request may cause the cryptography system to command one or more hardware devices to perform a SecureErase operation on one or more keys identified by the specified KeyID. Generally, the key(s) identified by the KeyID may be electronically shredded in any suitable manner, such as by overwriting data encoding the key with other data (e.g., a series of zeroes or ones or a random string). If the key(s) are stored encrypted under a key, the key used to encrypt the keys may be electronically shredded, thereby causing a loss of access to the key(s). In some embodiments, the shred operation may cause decrypt operations indicating the shredded KeyID to fail at some determined point in the future. Other manners of securely and permanently destroying any possible access to the key(s) may be used.

The ReKey(Ciphertext, OldKeyID, NewKeyID) request, in an embodiment, may be used to cause the cryptography service to encrypt ciphertext under a different key. When the cryptography service receives a ReKey(Ciphertext, OldKeyID, NewKeyID) request, it may use a key identified by the OldKeyID to decrypt the specified ciphertext and then use a key identified by the NewKeyID to encrypt the decrypted ciphertext. If a key identified by the NewKeyID does not yet exist, the cryptography service may generate a key to use and associate the generated key with the specified NewKeyID, such as described in connection the Create (KeyID) request described above. In some embodiments, the ReKey operation may be operable to cause data to be transferable between isolated instances of a cryptography service. In some embodiments, a policy might permit a rekey operation to be performed on a ciphertext but might not permit the same requestor to directly decrypt the ciphertext. In some embodiments, ReKey might support rekeying a ciphertext from a key identified by a first KeyID within a first account to a key identified by a KeyID within a second account.

Similarly, the frontend system may implement a policy configuration API which, in an embodiment, enables users to submit requests for configuring policies for the performance of cryptographic operations and for other policy-related operations. Policies may be associated with keys, groups of keys, accounts, users, and other logical entities in various embodiments. Example policies, which may be configured via the policy configuration API, are provided below. In an embodiment, the cryptography service policy configuration API includes the following requests:

SetKeyPolicy(KeyID, Policy)
Suspend(KeyID, Public Key)
Reinstate(KeyID, Private Key)

In an embodiment, the SetKeyPolicy(KeyID, Policy) request may be used to cause the cryptography service to store a policy on the key (or family of keys) identified by the KeyID. A policy may be information that is determinative of whether a requested cryptographic operation can be performed in a particular context. The policy may be encoded in a declarative access control policy language, such as eXtensinble Access Control Markup Language (XACML), Enterprise Privacy Authorization Language (EPAL), Amazon Web Services Access Policy Language, Microsoft SecPol, or any suitable way of encoding one or more conditions that must be satisfied for a cryptographic operation to be performed. Policies may define what operations can be performed, when the operations can be performed, which entities can make authorized requests for operations to be performed, which information is required for a particular request to be authorized, and the like. In addition, policies may be defined and/or enforced using access control lists, privileges associated with users, and/or operation bitmasks in addition to or instead of the examples given above. Example policies appear below.

In some embodiments the cryptographic service may support a suspend operation, e.g., using a Suspend(KeyID, Public Key) API call. A suspend operation enables the customer of the cryptographic service to deny the operator of the cryptographic service use of or access to a key. This can be useful to customers concerned about covert lawful orders or other circumstances in which the operator of the cryptographic service might be compelled to perform some operation using a key. It may also be useful to customers that wish to lock particular data and render it inaccessible online. In some embodiments, a suspend operation might include receiving a public key from a customer and encrypting the key specified by a given KeyID with the received public key and shredding the key specified by the KeyID, such that the provider is not able to access the suspended key unless the private key associated with the public key is provided, e.g., using a Reinstate(KeyID, Private Key) API call that both specifies the KeyID and includes the private key. In some other embodiments, a suspend operation might involve encrypting a key associated with a specified KeyID using another key managed by the cryptographic service, including without limitation one created for the purpose of the instant suspend operation. The ciphertext produced by this operation can be provided to the customer and not retained within the cryptographic service. The original key identified by the KeyID can then be shredded. The cryptographic service may be operable to receive the provided ciphertext and re-import the suspended key. In some embodiments, the ciphertext may be generated in a manner that will prevent the cryptographic service from returning a decrypted version to the customer.

As illustrated in FIG. 12, the cryptography service 1200 includes a backend system 1202 that itself comprises various components in some embodiments. For example, the backend system in this example includes a request processing system (unit) 1204 which may be a subsystem of the cryptography service 1200 that is configured to perform operations in accordance with requests received through either the request API 1206 or the policy configuration API 1208. For example, the request processing component may receive requests received via the request API and the policy configuration API determines whether such requests are authentic and are therefore fulfillable and may fulfill the requests. Fulfilling the request may include, for example, performing and/or having performed cryptographic operations. The request processing unit may be configured to interact with an authentication interface 1210 which enables the request processing unit to determine whether requests are authentic. The authentication interface may be configured to interact with an authentication service such as described above. For example, when a request is received by the request processing unit, the request processing unit may utilize the authentication interface to interact with an authentication service which may, if applicable, provide authentication proof that may be used in order to cause a performance of cryptographic operations.

The backend system of the cryptography service 1200 also, in this illustrative example, includes a plurality of a security modules 1212 (cryptography modules), a policy enforcement module 1214, and a coordinator module 1216. One or more of the security modules may be hardware security modules although, in various embodiments, a security module may be any suitable computer device configured according to have capabilities described herein. Each security module in an embodiment stores a plurality of keys associated with KeyIDs. Each security module may be configured to securely store the keys so as to not be accessible by other components of the cryptography service 1200 and/or other components of other systems. In an embodiment, some or all of the security modules are compliant with at least one security standard. For example, in some embodiments, the security modules are each validated as compliant with a Federal Information Processing Standard (FIPS) outlined in FIPS Publication 140-1 and/or 140-2, such as one or more security levels outlined in FIPS Publication 140-2. In addition, in some embodiments, each security module is certified under the Cryptographic Module Validation Program (CMVP). A security module may be implemented as a hardware security module (HSM) or another security module having some or all capabilities of an HSM. In some embodiments, a validated module is used to bootstrap operations. In some embodiments, customers can configure some keys that are stored in and operated on only by validated modules and other keys that are operated on by software. In some embodiments, the performance or cost associated with these various options may differ.

The security modules may be configured to perform cryptographic operations in accordance with instructions provided by the request processing unit. For example, the request processing unit may provide ciphertext and a KeyID to an appropriate security module with instructions to the security module to use a key associated with the KeyID to decrypt the ciphertext and provide in response the plaintext. In an embodiment, the backend system of the cryptography service 1200 securely stores a plurality of keys forming a key space. Each of the security modules may store all keys in the key space; however, variations are considered as being within the scope of the present disclosure. For example, each of the security modules may store a subspace of the key space. Subspaces of the key space stored by security modules may overlap so that the keys are redundantly stored throughout the security modules. In some embodiments, certain keys may be stored only in specified geographic regions. In some embodiments, certain keys may be accessible only to operators having a particular certification or clearance level. In some embodiments certain keys may be stored in and used only with a module operated by a particular third party provider under contract with the provider of data storage services. In some embodiments, constructive control of security modules may require that lawful orders seeking to compel use of keys other than as authorized by the customer to involve either additional entities being compelled or additional jurisdictions compelling action. In some embodiments, customers may be offered independent options for the jurisdiction in which their ciphertexts are stored and their keys are stored. In some embodiments, security modules storing keys may be configured to provide audit information to the owner of the keys, and the security modules may be configured such that the generation and providing of audit information not suppressible by the customer. In some embodiments, the security modules may be configured to independently validate a signature generated by the customer such that the provider (e.g., hosting the security modules) is not able to perform operations under keys stored by the security modules. In addition, some security models may store all of the key space and some security modules may store subspaces of the key space. Other variations are also considered as being the scope of the present disclosure. In instances where different security modules store different subspaces of the key space, the request processing unit may be configured such as with a relational table or other mechanism to determine which security module to instruct to perform cryptographic operations in accordance with various requests.

In an embodiment, the policy enforcement module is configured to obtain information from a request processing unit and determine, based at least in part on that information, whether the request received through the API may be performed. For example, when a request to perform cryptographic operation is received through the request API, the request processing unit may interact with the policy enforcement module to determine whether fulfillment of the request is authorized according to any applicable policy such as policy applicable to a specified KeyID in the request and/or other policies such as policy associated with the requestor. If the policy enforcement module allows fulfillment of the request, the request processing unit may, accordingly, instruct an appropriate security module to perform cryptographic operations in accordance with fulfilling the request.

As with all figures described herein, numerous variations are considered as being within the scope of the present disclosure. For example, FIG. 12 shows the policy enforcement module separate from security modules. However, each security module may include a policy enforcement module in addition to or instead of the policy enforcement module illustrated as separate. Thus, each security module may be independently configured to enforce policy. In addition, as another example, each security module may include a policy enforcement module which enforces policies different from policies enforced by a separate policy enforcement module. Numerous other variations are considered as being within the scope of the present disclosure.

Cryptographic operations that may be performed in various embodiments include, but are not limited to digital signature generation, digital signature verification, encryption, decryption, and random number generation. Operations that utilize cryptographic keys include, but are not limited to, public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers, and digital signature schemes. Example symmetric key algorithms include, but are not limited to, the advanced encryption standard (AES), the data encryption standard (DES), triple DES (3DES), Serpent, Twofish, blowfish, CAST5, RC4, and the international data encryption algorithm (IDEA). Example modes of block ciphers include, but are not limited to, the cipher-block chaining (CBC) mode, propagating cipher-block chaining (PCBC) mode, cipher feedback mode (CFB), output feedback (OFB) mode, counter (CTR) mode, and other modes, such as authenticated encryption modes such as eXtended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman+CTR (CWC) mode, Counter with CBC-MAC (CCM) mode, and Galois/Counter (GCM) mode. Symmetric key algorithms may also include those used to generate output of one way functions and include, but are not limited to algorithms that utilize hash-based message authentication codes (HMACs), message authentication codes (MACs) in general, PBKDF2, and Bcrypt. Asymmetric key algorithms may also include various schemes for performing cryptographic operations on data. Example algorithms include, but are not limited to, those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

As illustrated in FIG. 12, a storage device service 1216 (or other service(s)) may utilize the request API 1206 provided by the cryptography service 1200 to cause the cryptography service 1200 to perform cryptographic operations, such as described above. The storage device service may be a computer system (e.g., distributed computer system) that is configured to provision and host data storage devices (e.g., block-level storage devices), which may be physical and/or virtual data storage devices, for users of the service (e.g., customers of a computing resource service provider). The storage device service may provide a web service or other API through which data storage devices are programmatically manageable. Management of a storage device may include attachment (e.g., logical attachment over a network) of the storage device to a computer system, which may be provided as a service by another computer system (not pictured), to enable the computer system to utilize the storage device for data storage operations. Such a storage device may be virtualized to enable the computer system to operate as if the storage device was locally (e.g., physically) attached. Such computer systems may also be programmatically manageable through a corresponding service.

As part of management of a data storage device, an operation may be to utilize encryption for data stored on a data storage device. To accomplish such encryption, the storage device service (e.g., a computing device of the storage device service 1216) may submit API calls to the cryptography service 1200 to cause the performance of various cryptographic operations. For example, a data storage device may be provisioned with a cryptographic key provided by the cryptography service using appropriate API calls, such as described above.

Various workflows may be used to provision data storage devices in accordance with various embodiments. For example, in some embodiments, a data storage device is provisioned with an identifier of a cryptographic key and an encrypted data key usable to encrypt data stored on the data storage device and then attached to a computer system. The encrypted data key may be obtained such as by causing, via API call, the cryptography service 1200 to generate the data key, encrypt the data key, and provide the encrypted data key without providing the data key in plaintext form, such as described above. A management subsystem of the storage device service may authenticate such an API call for the cryptography service 1200 and may have a first level of privileges (e.g., sufficient to cause the cryptography service to generate a data key and provide the generated data key in encrypted form and insufficient to obtain the data key in plaintext form).

Another entity, e.g., the computer system to which the storage device is attached or a management subsystem of a computer system service, may provide the encrypted data key to the cryptography service 1200 for decryption so that data stored on the data storage device can be encrypted and/or decrypted. The entity may have a second level of privileges with the cryptography service 1200 (e.g., sufficient to obtain the data key in plaintext form) and may prove authorization to obtain the data key in plaintext form using a digital signature or other authentication mechanism. As noted, the data key may have been encrypted with information usable to verify validity of the data key (e.g., a plaintext data integrity value). Accordingly, when the entity receives the data key in plaintext form, it may use the information usable to verify validity of the data key to verify the validity of the data key and operate in accordance with whether validity of the data key has been verified. For example, if the validity of the data key is unsuccessfully verified, the entity may attempt again decryption of the data key, may obtain another copy of the encrypted data key from another data storage location (e.g., a cache, backup, or other persistent data storage location) and attempt decryption again. If the validity is verified, the entity may utilize the data key for encryption and/or decryption of data in connection with the data storage device.

Figure 13:
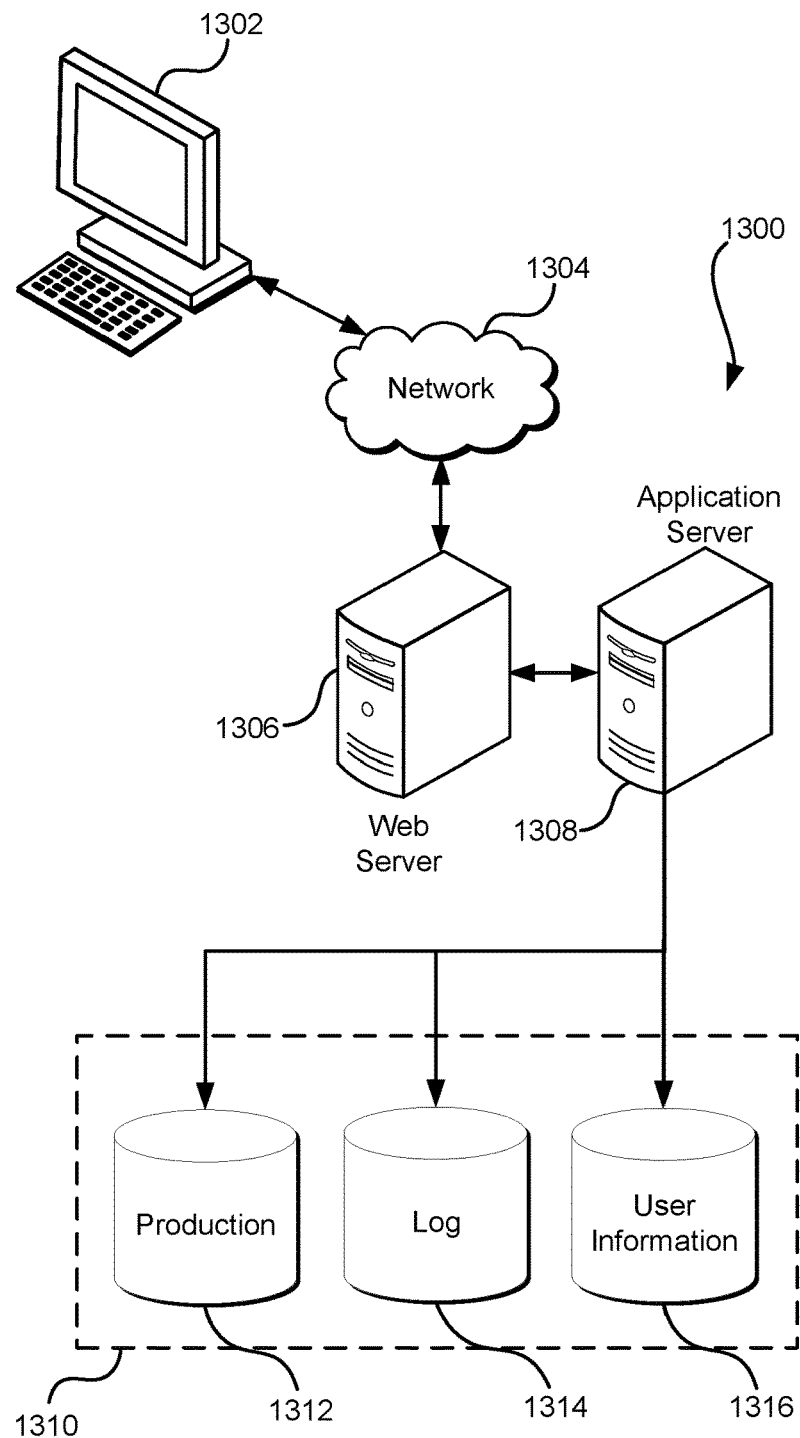
FIG. 13 illustrates an environment in which various embodiments can be implemented.

FIG. 13 illustrates aspects of an example environment 1300 for implementing aspects in accordance with various embodiments. As will be appreciated, although a web-based environment is used for purposes of explanation, different environments may be used, as appropriate, to implement various embodiments. The environment includes an electronic client device 1302, which can include any appropriate device operable to send and/or receive requests, messages, or information over an appropriate network 1304 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network, or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually, and/or through other senses including touch, taste, and/or smell. The handling of all requests and responses, as well as the delivery of content between the client device 1302 and the application server 1308, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1310 can include several separate data tables, databases, data documents, dynamic data storage schemes, and/or other data storage mechanisms and media for storing data relating to a particular aspect of the present disclosure. For example, the data store illustrated may include mechanisms for storing production data 1312 and user information 1316, which can be used to serve content for the production side. The data store also is shown to include a mechanism for storing log data 1314, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update, or otherwise process data in response thereto. The application server 1308 may provide static, dynamic, or a combination of static and dynamic data in response to the received instructions. Dynamic data, such as data used in web logs (blogs), shopping applications, news services, and other such applications, may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1302. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar references in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C,"

unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, at a computer system and from another computer system, data and an integrity value associated to a plaintext;
    selecting an algorithm to determine information to verify validity of the data;
    determining, in accordance with the algorithm, the information to verify validity of the data;
    in response to determining the integrity value and the information to verify validity of the data match, generating ciphertext by performing an encryption operation on the plaintext using at least a cryptographic key, wherein the plaintext encodes the data and the information to verify validity of the data, and further wherein the generated ciphertext is decryptable, by the cryptographic key, to obtain the data and the information to verify validity of the data; and
    providing the ciphertext.

2. The computer-implemented method of claim 1, wherein the method further comprises obtaining an application programming interface request that specifies the data and determining the information to verify validity of the data is performed in response to obtaining the application programming interface request.

3. The computer-implemented method of claim 1, wherein:
    the method comprises generating the data; and
    determining the information to verify validity of the data includes generating the information to validity of the data.

4. The computer-implemented method of claim 1, wherein:
    the information to verify validity of the data is a cryptographic hash; and
    the method further comprises using the information to verify validity of the data to verify validity of the data.

5. The computer-implemented method of claim 1, wherein determining the information to verify validity of the data comprises generating the information to verify validity of the data.

6. The computer-implemented method of claim 1, wherein the method further comprises selecting the algorithm in accordance with a specified mode of verification.

7. The computer-implemented method of claim 1, wherein the plaintext comprises the data and the information to verify validity of the data.

8. A system, comprising memory to store instructions that, as a result of execution by one or more processors, cause the system to at least:
    obtain, from another system, data and an integrity value associated to a plaintext;
    determine, according to a mode of operation selected from a plurality of supported modes of operation, information to verify validity of an input without using a cryptographic key;
    in response to determining the integrity value and the information to verify validity of the input match, perform a cryptographic operation on the plaintext using at least the cryptographic key, thereby generating output, wherein the information to verify validity of the input is obtainable from the output, and further wherein the plaintext encodes the input and the information to verify validity of the input; and
    provide the output and a parameter to determine the mode of operation.

9. The system of claim 8, wherein the input is the plaintext and the output is ciphertext that encrypts at least the data and the information to verify validity of the input.

10. The system of claim 8, wherein:
    the data and the integrity value associated to the plaintext are obtained in a request from the other system to encrypt the data.

11. The system of claim 8, wherein:
    the cryptographic operation is an encryption operation, the output is ciphertext, and the input is data; and
    the memory further comprises instructions that, as a result of execution by the one or more processors, cause the system to verify authorization to access the data as a condition for providing the data and the information to verify the validity of the input.

12. The system of claim 8, wherein the instructions further include instructions that, as a result of execution by the one or more processors, cause the system to enforce one or more policies such that a first entity is authorized to cause the system to provide the output of the cryptographic operation, but unauthorized to cause the system to perform an inverse of the cryptographic operation to obtain at least a portion of the input, wherein the inverse of the cryptographic operation is performed using at least the cryptographic key.

13. The system of claim 8, wherein:
the instructions that cause the system to determine the input, as a result of execution by the one or more processors, cause the system to decrypt, using a first cryptographic key, a first ciphertext, thereby resulting in data;
the cryptographic operation comprises encryption of the data; and
the output is a second ciphertext that encrypts both the data and the information to verify validity of the input.

14. The system of claim 8, wherein the instructions further include instructions that, when as a result of execution by the one or more processors, cause the system to verify validity of the input using the information to verify validity of the input as a condition for performing the cryptographic operation.

15. The system of claim 8, wherein the instructions further include instructions that, as a result of execution by the one or more processors, cause the system to:
as a result of an unsuccessful verification of the input as a result of a mismatch between the input and the information to verify validity of the input, modify the input to cause the input and the information to verify validity of the input to match prior to performance of the cryptographic operation.

16. A non-transitory computer-readable storage medium having stored thereon instructions that, if executed by one or more processors of a computer system, cause the computer system to:
obtain, from another computer system, ciphertext and a parameter to determine a cryptographic hash algorithm;
cause a decryption operation to be performed based at least in part on the ciphertext and a cryptographic key, the decryption operation resulting in data and information to verify validity of the data, the information to verify validity of the data being encrypted by the ciphertext, wherein the ciphertext is obtainable by performing a cryptographic operation on a plaintext using at least the cryptographic key, thereby generating the ciphertext, wherein the plaintext encodes the data and the information to verify validity of the data;
use the information to verify the validity of the data to verify validity of the data according to the cryptographic hash algorithm; and
on a condition that the information to verify validity of the data indicates the data is valid, provide the data and the information to verify validity of the data.

17. The non-transitory computer-readable storage medium of claim 16, wherein:
the instructions to obtain the ciphertext and the parameter include instructions to obtain a request that encodes both the ciphertext and the parameter; and
the cryptographic algorithm is associated with a mode of verification.

18. The non-transitory computer-readable storage medium of claim 16, wherein instructions further include instructions that, if executed by the one or more processors, cause the computer system to cause an encryption operation to be performed based at least in part on the cryptographic key, the data, and the information to verify validity of the data, thereby generating the ciphertext.

19. The non-transitory computer-readable storage medium of claim 18, wherein the instructions that cause the computer system to cause the encryption operation to be performed, if executed by the one or more processors, further cause the computer system to cause another computer system to generate the data and perform the encryption operation.

20. The non-transitory computer-readable storage medium of claim 18, wherein the instructions that cause the computer system to cause the decryption operation to be performed, if executed by the one or more processors, cause the computer system to submit an application programming request to another computer system to cause the another computer system to perform the decryption operation.

21. The non-transitory computer-readable storage medium of claim 20, wherein the request specifies a cryptographic key of a plurality of cryptographic keys accessible to the another computer system thereby causing the another computer system to select the specified cryptographic key from the plurality of cryptographic keys and use the specified cryptographic key to perform the decryption operation.

* * * * *